US011155696B2

(12) United States Patent
Fini

(10) Patent No.: US 11,155,696 B2
(45) Date of Patent: *Oct. 26, 2021

(54) PREPARATION AND USES OF BIO-ADHESIVES

(71) Applicant: North Carolina Agricultural and Technical State University, Greensboro, NC (US)

(72) Inventor: Elham H. Fini, Asheboro, NC (US)

(73) Assignee: North Carolina Agricultural and Technical State University, Greensboro, NC (US)

(*) Notice: Subject to any disclaimer, the term of this patent is extended or adjusted under 35 U.S.C. 154(b) by 408 days.

This patent is subject to a terminal disclaimer.

(21) Appl. No.: 16/126,354

(22) Filed: Sep. 10, 2018

(65) Prior Publication Data

US 2019/0112454 A1 Apr. 18, 2019

Related U.S. Application Data

(60) Continuation of application No. 15/470,396, filed on Mar. 27, 2017, now Pat. No. 10,077,356, which is a (Continued)

(51) Int. Cl.
| | |
|---|---|
| C08K 11/00 | (2006.01) |
| C08L 95/00 | (2006.01) |
| B01D 3/10 | (2006.01) |
| B01D 3/40 | (2006.01) |
| C09D 195/00 | (2006.01) |

(Continued)

(52) U.S. Cl.
CPC .............. C08K 11/005 (2013.01); B01D 3/10 (2013.01); B01D 3/40 (2013.01); C08L 95/00 (2013.01); C09D 191/00 (2013.01); C09D 195/00 (2013.01); E01C 7/35 (2013.01); C08L 2555/64 (2013.01); E01C 7/262 (2013.01); Y02A 30/30 (2018.01)

(58) Field of Classification Search
None
See application file for complete search history.

(56) References Cited

U.S. PATENT DOCUMENTS

| | | | |
|---|---|---|---|
| 3,733,255 | A | 5/1973 | Appell |
| 6,506,223 | B2 | 1/2003 | White |

(Continued)

FOREIGN PATENT DOCUMENTS

| | | |
|---|---|---|
| EP | 2 898 037 B1 | 6/2020 |
| WO | WO 2014/047462 | 3/2017 |

OTHER PUBLICATIONS

Notice of Publication corresponding to U.S. Appl. No. 16/259,643 dated Nov. 1, 2019.

(Continued)

*Primary Examiner* — Stefanie J Cohen
(74) *Attorney, Agent, or Firm* — Jenkins, Wilson, Taylor & Hunt, P.A.

(57) ABSTRACT

The present application relates generally to bio-adhesive components isolated from bio-oil prepared from animal waste, methods of preparation of the bio-adhesive components and uses thereof. Such uses include, but are not limited to, asphalt bio-binders, bio-adhesion promoters, asphalt bio-rejuvenators, asphalt bio-extenders, bio-asphalt as well as uses in roofing, soil stabilization, crack and joint sealing and flooring adhesives.

19 Claims, 9 Drawing Sheets

Related U.S. Application Data division of application No. 14/032,445, filed on Sep. 20, 2013, now Pat. No. 9,637,615.

(60) Provisional application No. 61/782,547, filed on Mar. 14, 2013, provisional application No. 61/704,175, filed on Sep. 21, 2012.

(51) Int. Cl.
  *C09D 191/00* (2006.01)
  *E01C 7/35* (2006.01)
  *E01C 7/26* (2006.01)

(56) References Cited

U.S. PATENT DOCUMENTS

| | | |
|---|---|---|
| 7,105,088 B2 | 9/2006 | Schien et al. |
| 7,754,322 B2 | 7/2010 | Tilbrook et al. |
| 7,951,417 B1 | 5/2011 | Wen et al. |
| 7,985,345 B2 | 7/2011 | Lux et al. |
| 8,100,990 B2 | 1/2012 | Ellens et al. |
| 9,637,615 B2 | 5/2017 | Fini |
| 10,077,356 B2 | 9/2018 | Fini |
| 2009/0062516 A1 | 3/2009 | Belanger |
| 2009/0275674 A1 | 11/2009 | Tian |
| 2011/0294927 A1 | 12/2011 | Williams et al. |
| 2014/0083331 A1 | 3/2014 | Fini |
| 2014/0261075 A1 | 9/2014 | Chirdon |
| 2016/0053141 A1 | 2/2016 | Grun |
| 2016/0229997 A1 | 8/2016 | Mohanty |
| 2016/0326367 A1 | 11/2016 | Mohanty |
| 2017/0107334 A1 | 4/2017 | Mohanty |
| 2017/0260371 A1 | 9/2017 | Fini |
| 2019/0233638 A1 | 8/2019 | Zhang et al. |

OTHER PUBLICATIONS

Yang et al.,"Biorenewable epoxy resins derived from plant-based phenolic acids," ACS Sustainable Chemistry & Engineering, 4(12), pp. 6524-6533 (2016).
Yue et al., "A sustainable alternative to current epoxy resin matrices for vacuum infusion molding," Composites Part A: Applied Science and Manufacturing, 100, pp. 269-274 (2017).
Fini, et al., "Chemical Characterization of Biobinder from Swine Manure: Sustainable Modifier for Asphalt Binder," Journal of Materials in Civil Engineering, vol. 23, No. 11, pp. 1506-1513 (2011).
Office Action (Restriction Requirement) corresponding to U.S. Appl. No. 16/259,643 dated Jul. 13, 2020.
Office Action corresponding to U.S. Appl. No. 16/259,643 dated Oct. 5, 2020.
Office Action corresponding to European Patent Application No. 13 838 845.9 dated Sep. 5, 2019.
Intent to Grant corresponding to European Patent Application No. 13 838 845.9 dated Jan. 17, 2020.
Alternative Binders for Sustainable Asphalt Pavements, Transporation Research Circular, No. E-C165, pp. 1-85 (Aug. 2012).
Fini et al., "Bonding Property of Bituminous Crack Sealants in the Presence of Water," American Journal of Engineering and Applied Science. vol. 4, No. 1, pp. 124-129 (2011).
Fini et al, "Development of Pressurized Blister Test for Interface Characterization of Aggregate-Highly Polymerized Bituminous Materials," ASCE Journal of Materials, American Society of Civil Engineering (ASCE), vol. 23, No. 5, pp. 656-663 (2011).
Fini et al, "Reducing Asphalt's Low Temperature Cracking by Disturbing its Crystallization," 7th RILEM International Conference on Cracking in Pavements Jun. 20-22, 2012 in Delft, Netherlands, RILEM Bookseries, vol. 4, pp. 911-919 (Jun. 2012).
Fini et al., "Bio-Modified Rubber: A Sustainable Alternative for Use in Asphalt Pavements," ICSDEC 2012 Developing the Frontier of Sustainable Design, Engineering, and Construction, ASCE, pp. 1-13 (2012).
Fini et al., "Characterization and Application of Manure-Based Bio-binder in Asphalt Industry," Paper No. 10-2871 The 89th Transporation Research Board Annual Meetings, Washington, D.C., pp. 1-14 (14 pages) (Jan. 2010).
Fini et al., "Chemical Characterization of Biobinder from Swine Manure: A Sustainable Modifier for Asphalt Binder," Journal of Materials in Civil Engineering. vol. 23, No. 11, pp. 1506-1513 (2011).
Fini et al., "Partial Replacement of Asphalt Binder with Bio-Binder: Characterization and Modification," International Journal of Pavement Engineering. pp. 1-8 (Jul. 4, 2011).
Fini et al., "Application of Swine Manure in Development of Bio-Adhesive," Allen D. Leman Swine Conference, p. 244 (Sep. 18, 2012).
Guo et al., "Pyrolysis Characterisitcs of Bio-oil Fractions Separated by Molecular Distillation," Applied Energy, vol. 82, No. 9 pp. 2892-2898 (2010).
He, "Rheological Hybrid Effect and itd Conditions in Filled Polymer Melts," Macromol. Symp., 277, pp. 43-50 (2009).
Hill et al., "Low-Temperature Performance Characterization of Biomodified Asphalt Mixtures That Contain Reclaimed Asphalt Pavement," Transportation Research Record: Journal of the Transportation Research Board 2371, pp. 49-57 (2013).
Interview Summary corresponding to U.S. Appl. No. 14/032,445 dated Dec. 5, 2016.
Mi et al., "Rheological Hybrid Effect in Dually Filled Polycarbonate Melt Containing Liquid Crystalline Polymer," Polymer Engineering and Science, DOI 10.1002/pen, pp. 289- 299 (2012).
Midgett, "Assessing a Hydrothermal Liquefaction Process Using Biomass Feedstocks," Thesis, Louisiana State University (2008).
Mogawer et al., "Performance Characteristics of High RAP Bio-Modified Asphalt Mixtures," Paper No. 12-2411, the 91st Transportation Research Board Annual Meetings, Washington, D.C., pp. 1-16 (Jan. 2012).
Notice of Allowance corresponding to U.S. Appl. No. 15/470,396 dated May 14, 2018.
Notice of Publication corresponding to International Application No. PCT/US2013/060968 dated Mar. 27, 2014.
Notification Concerning Transmittal of International Preliminary Report on Patentability (Chapter I of the Patent Cooperation Treaty) corresponding to International Patent Applciation No. PCT/US2013/060968 dated Apr. 2, 2015.
Notification of Transmittal of the International Search Report and the Written Opinion corresponding to International Patent Application No. PCT/US2013/060968 dated Dec. 13, 2013.
Ocfemia, "Hydrothermal Process of Swine Manure to Oil Using a Continuous Reactor System," Dissertation, University of Illinois at Urbana-Champaign, AAT 3202149, pp. iii-183 (Sep. 22, 2005).
Ocfemia et al., "Hydrothermal Processing of Swine Manure to Oil Using a Continuous Reactor System: Effects of Operating Parameters on Oil Yield and Quality," Transactions of the ASABE. vol. 49, No. 6 pp. 1897-1904 (2006).
Ocfemia, K. S., Zhang, Y., & Funk, T. "Hydrothermal processing of swine manure into oil using a continuous reactor system: Development and testing." Transactions-American Society of Agricultural Engineers, 49(2), 533-541 (2006).
Office Action (Restriction Requirement) corresponding to U.S. Appl. No. 14/032,445 dated Nov. 9, 2015.
Office Action and Interview Summary corresponding to U.S. Appl. No. 14/032,445 dated May 31, 2016.
Office Action corresponding to U.S. Appl. No. 15/470,396 dated Nov. 15, 2017.
Onochie et al., "Rheological Characterization of Nano-particle based Bio-modified Binder," Transportation Research Board 92nd Annual Meeting, Washington, D.C., 16 pages (2013).
Supplementary European Search Report corresponding to European Patent Application No. 13838845.9-1302 dated Apr. 8, 2016.
Taratec Corporation, "NuVention Solutions, Inc.," in 2011 TFAMP Evalulation Summary, pp. 1-2 (Aug. 2011).
US EPA AG 101 Poultry Production; www.epa.gov/oecaagct/ag101/printpoultry.html; last updated Jun. 27, 2012; pp. 1-32.

(56) References Cited

OTHER PUBLICATIONS

USDA, "Poultry—Production of Value 2012 Summary," United States Department of Agriculture, National Agricultural Statistics Serives, 14 pages (Apr. 2013).
Xiu et al., "Bio-oil production and upgrading research : A review," Renewable and Sustainable Energy Reviews. vol. 16 pp. 4406-4414 (2012).
Yero et al., "Viscosity Characteristics of Modified Bitumen," ARPN Journal of Science and Technology, vol. 2, No. 5, pp. 500-503 (Jun. 2012).
You et al., "Evaluation of Low-Temperature Binder Properties of Warm-Mix Asphalt, Extracted and Recovered RAP and RAS, and Bioasphalt," Journal of Materials in Civil Engineering. vol. 23, No. 11 pp. 1569-1574 (2011).
Notice of Allowance corresponding to U.S. Appl. No. 16/259,643 dated Jun. 10, 2021.
Corrected Notice of Allowability corresponding to U.S. Appl. No. 16/259,643 dated Aug. 4, 2021.
Interview Summary corresponding to U.S. Appl. No. 16/259,643 dated Aug. 31, 2021.

PREPARATION AND USES OF BIO-ADHESIVES

RELATED APPLICATIONS

This application is a continuation of U.S. patent application Ser. No. 15/470,396, filed on Mar. 27, 2017, now U.S. Pat. No. 10,077,356, the disclosure of which is incorporated herein by reference in its entirety, and which is a divisional of U.S. patent application Ser. No. 14/032,445, filed on Sep. 20, 2013, now U.S. Pat. No. 9,637,615, the disclosure of which is incorporated herein by reference in its entirety, and which claims priority under 35 U.S.C. § 119(e) to U.S. Provisional Patent Application Ser. Nos. 61/782,547, filed Mar. 14, 2013, and 61/704,175, filed Sep. 21, 2012, the disclosure of each of which is incorporated herein by reference in its entirety.

STATEMENT AS TO RIGHTS TO INVENTIONS MADE UNDER FEDERALLY SPONSORED RESEARCH OR DEVELOPMENT

This invention was made with government support under Grant Nos. IIP-1246330, CMMI-1150695, CBET-1040246, CBET-0923425, and 0955001 awarded by the National Science Foundation. The government has certain rights in the invention.

FIELD

The present inventions relate generally to bio-adhesive components isolated from bio-oil prepared from animal waste, methods of preparation of the bio-adhesive components and uses thereof.

BACKGROUND

According to the USDA, "the combined value of production from broilers, eggs, turkeys, and the value of sales from chickens in 2011 was $35.6 billion . . . . Of the combined total, 65 percent was from broilers, 21 percent from eggs, 14 percent from turkeys, and less than 1 percent from chickens." (USDA, National Agricultural Statistics Service "Poultry—Production and Value 2011 Summary" (April 2012)) According to the US EPA the composition of solid manure from pullets and laying hens in layer cages can range in dry matter between 20% and 60% and semi-solid manure contains 12 to 20% solids. (US EPA| Ag 101| Poultry Production, www.epa.gov/oecaagct/ag101/printpoultry.html). Poultry manure is typically used in surface applications to croplands.

Within the United States, pork production is a major agricultural enterprise; specifically, a gross income of roughly $16 billion resulted from the sale of 116 million pigs in 2008. In general, pigs weighing 21 to 100 kg generate 0.39 to 0.45 kg of waste per day per pig on a dry matter basis. Swine manure is usually disposed of by storage in lagoons. This process has significant negative environmental impacts, particularly with respect to surface water and groundwater quality as well as air quality, which is affected by odors and gaseous emissions.

Dairy and beef production are similarly important components of U.S. agricultural efforts. Removal or treatment of animal waste is analogously a key consideration as the number of cows raised in the U.S. trends upwards.

To improve the ultimate processing of beef, dairy, poultry, sheep and swine manure, researchers have developed methods to convert manure to gas and/or oil. Collection of manure is easier in confined animal feeding operations, due in part to bulk processing of waste, as well as the controlled diet of the animals. Bio-oil produced from animal waste is an energy-dense crude oil that is similar to petroleum extracts. By-products of bio-oil produced from animal waste include an aqueous phase and a solid phase; uses for both by-products have been identified in the art.

Petroleum-based products, such as adhesives, are used in pavement construction as asphalt binders, adhesion promoters, asphalt extenders and asphalt concrete. In addition they are used in roofing, soil stabilization, crack and joint sealing and as flooring adhesives.

The U.S. asphalt market is valued at approximately $11.7 billion/year. Asphalt supplies are shrinking, while the demand for it is increasing rapidly. As the price of asphalt increases, the demand for alternative and renewable resources increases.

The trend toward sustainable pavements has led the pavement industry to emphasize use of recycled materials, including rubber from tires and fly ash as well as reclaimed asphalt pavement (RAP) and recycled asphalt shingles (RAS) in pavement construction. Use of these recycled products reduces the environmental liability of RAP and RAS and further reduces the amount of virgin asphalt used in pavement construction. In the U.S., about 100 million tons of RAP and 11 million tons of RAS are produced annually. Because asphalt in both RAP and RAS is much stiffer than virgin asphalt, inclusion of RAP and/or RAS lead to a significant increase in the stiffness of the resulting recycled-asphalt mixture. Stiff asphalt mixtures have been shown to be hard to place and susceptible to cracking a lower temperatures. Addressing these factors is an important challenge to the use of high percentages of RAP and RAS in pavement construction.

Hot-mix asphalt production is the most common paving approach in the United States; however, concerns about the process's environmental pollution continue to grow because of the emission of greenhouse gases during the construction of hot-mix pavement. To address these concerns, a new group of technologies has been developed for asphalt pavement production. These technologies, called warm mix asphalt (WMA), allow producers of asphalt pavement material to lower the temperatures at which the material is mixed and placed on the road. Reductions of 50° F. to 100° F. have been observed. Reducing production temperature results in reduced fuel consumption as well as reduced greenhouse emissions, and improves job site conditions for workers. Lower production temperature also reduces the initial aging of the binder, which can improve long-term durability and pavement performance. To produce WMA, several different technologies and additives have been used along with asphalt binder to reduce viscosity of the binder. However, most of these additives are petroleum-based and costly.

Despite the large market for scrap tires, roughly a quarter of all scrap tires end up in landfills each year numbering to approximately 27 million tires or roughly 6 million tons annually making up over 12% of all solid waste. Due to cross-linking between the rubber polymer chains, numerous additives, and stabilizers within its structure, rubber is extremely resistant to natural degradation making it troublesome for landfill storage. Crumb rubber's use in asphalt binder and pavements provides an environmentally sustainable method for disposing the millions of tires generated annually. Generally, tires are ground using ambient or cryogenic means, the goal of which is to reduce the size of the rubber into a fine powder of particle sizes smaller than 2 mm in diameter. The rubber can be used in a variety of uses, including a modifier for petroleum-based asphalt binder. The modification of asphalt mixture with rubber is typically classified into three different methods: (a) Dry Process, which uses crumb rubber as an aggregate substitute; (b) Wet Process with Agitation, in which large particles (particles not passing No. 50 Sieve) are blended with the binder while applying agitation during mixing to keep crumb rubber particles uniformly distributed; and (c) Wet Process with no Agitation, in which small particles (passing No. 50 Sieve) are blended with asphalt binder with no agitation.

One important variable in asphalt concrete pavements is adhesion between aggregate and asphalt/bitumen. Adhesion promoters, also known as anti-strips, are used to improve the interaction between asphalt and the aggregates comprising asphalt concrete. Changes to the use of asphalt concrete pavements and advances in technology have led to an increased need for adhesion promoters of particular characteristics. In particular, users are looking for asphalt pavements having longer lifespans, but over which the pavements will be subjected to increasing traffic loads. Adhesion promoters are used for a variety of goals, including by not limited to mitigating and inhibiting the damaging effects of moisture in asphalt pavements. Water damage is manifest in a number of ways, which can lead to potholes, for example, freeze-thaw cycles exacerbate the effect of water damage. On the molecular level the result of water damage is the loss of adhesion between the binder and the aggregate, also known as stripping. The majority of current adhesion promoters are petroleum-based and suffer from increasing demand and correspondingly cost, while supplies are shrinking. A source of non-petroleum based adhesion promoters is needed in the industry.

Asphalt rejuvenators are generally used to restore the balance between maltenes and asphaltenes in asphalt binder that has been disturbed over time due to progressive aging. Because of weathering or oxidation, the ratio of maltenes to asphaltenes is changed as some of the maltenes compounds are transformed to asphaltenes component over time. The effectiveness of a rejuvenator is typically evaluated by whether it can restore the maltene/asphaltene balance; targeted rejuvenators usually contain maltenes-type fractions to improve and balance the maltenes to asphaltenes ratio. To evaluate its effectiveness as a rejuvenator a test method, including but not limited to asphalt penetration, viscosity, or abrasion loss test are used.

Asphalt rejuvenators are usually formulated to revive an aging pavement, improving the composition of the asphalt cement and increase penetration value of the asphalt cement in the top portion of the pavement thereby increasing the durability and lifespan of the pavement and to seal pavement against air and water, thereby slowing oxidative degradation. Typically, rejuvenators are used on asphalt pavement to stop and/or reverse shrinking which can lead to hairline cracking, to inhibit pitting and raveling, and to reduce air and water permeability, which can lead to pavement degradation. Asphalt rejuvenators can be used in asphalt rehabilitation as well as hot-in place and cold-in place recycling.

Asphalt extenders are generally petroleum-based products enabling the recycling of asphalt waste, such as RAP, RAS, as well as natural asphalt sources such as rock asphalt, tar sands, Gilsonite, and Trinidad Lake Asphalt. Asphalt extenders enable a larger amount of asphalt waste material to be used in a performance grade asphalt mix, thereby reducing the cost of the performance grade asphalt mix having the targeted mechanical and physical properties. Alternate sources of asphalt extenders are needed in the industry, particular as petroleum sources become ever more expensive and continue to raise environmental concerns.

The above-identified needs in the asphalt industry have motivated several unsuccessful attempts by researchers to produce bio-asphalt from various materials (sugar, molasses, potato starches, vegetable oils, lignin, cellulose, palm oil waste, coconut waste, and dried sewage). However, those bio-asphalts either found not to be feasible or never reached the asphalt market due to low performance or high production cost.

Thus, there remains a need for non-petroleum based asphalt that can be used in pavement construction. In particular, there is a need for asphalt bio-binders, bio-adhesion promoters, asphalt bio-rejuvenators, asphalt bio-extenders as well as bio-asphalt. In addition, there is a need for bio-adhesives that can be used roofing, soil stabilization, crack and joint sealing and as flooring adhesives.

SUMMARY

The present application is generally directed to the production of bio-adhesives having targeted viscosities. As disclosed herein, bio-adhesive components can be prepared from a bio-oil isolated from animal waste, including but not limited to beef, dairy, swine, poultry, sheep manures or combinations thereof.

In one aspect, the present application discloses a method of isolating a bio-adhesive composition from a bio-oil, the method comprising: (a) providing a bio-oil derived from animal waste; (b) distilling the bio-oil to remove a light liquid fraction, wherein the distilling occurs at a vacuum pressure of between about 1 mm Hg and about 80 mm Hg while heating to a temperature of up to about 60° C., optionally wherein the rate of the heating is between about 5° C. per hour and about 50° C. per hour; and (c) isolating a bio-adhesive composition from the bio-oil under conditions such that the viscosity of the bio-adhesive composition is not allowed to exceed about 1 centipoise (cP) at 135° C., optionally wherein the viscosity of the bio-adhesive composition is not allowed to exceed about 0.5 cP at 135° C.

In another aspect, the present application discloses a method of isolating a bio-adhesive composition from a bio-oil, the method comprising: (a) providing a bio-oil derived from animal waste; (b) distilling the bio-oil to provide a distilled heavy liquid fraction and a bio-residue that is not distilled, wherein the distilling occurs under vacuum pressure, optionally of between about 1 mm Hg and about 80 mm Hg, while heating to (1) a temperature ranging from about 60° C. to about 100° C., or (2) a temperature ranging from about 100° C. to about 160° C., wherein the viscosity of the bio-residue is not allowed to exceed about 1 cP at 135° C., optionally wherein the viscosity of the bio-residue is not allowed to exceed about 0.5 cP at 135° C. and further optionally wherein the rate of the heating is between about 5° C. per hour and about 50° C. per hour; and (c) isolating the bio-adhesive composition comprising the heavy liquid fraction.

In yet another aspect the present application discloses a bio-adhesive composition produced by any method disclosed herein.

In one aspect, the present application discloses a bio-adhesive composition comprising a heavy liquid fraction and a bio-residue, wherein the composition has a viscosity of at least about 0.5 cP at 135° C., optionally between about 0.5 cP and about 1 cP at 135° C. wherein said heavy liquid fraction and bio-residue are isolated from bio-oil produced from animal waste and wherein said bio-adhesive composition does not contain a light liquid fraction.

In another aspect, the present application discloses a bio-adhesive composition comprising a heavy liquid fraction having a viscosity of between about 0.1 cP and 0.5 cP at 135° C., optionally, between about 0.2 cP and about 0.5 cP, wherein said bio-adhesive composition does not contain a light liquid fraction and wherein said heavy liquid fraction is isolated from bio-oil produced from animal waste.

In one variation, the bio-adhesive composition comprises (a) a heavy liquid fraction comprising at least about 5% by weight of amide-containing compounds, optionally containing about 10% to about 20% by weight of amide-containing compounds, or (b) a heavy liquid fraction comprising up to about 5% by weight of amide-containing compounds, optionally about 1% to about 5% by weight of amide-containing compounds, wherein said bio-adhesive composition does not contain a light liquid fraction.

In another variation, the present application discloses a bio-adhesive composition comprising a bio-residue having a viscosity of at least about 0.4 cP, optionally between about 0.5 cP and 1 cP, at 135° C., wherein said bio-adhesive composition does not contain a light liquid fraction and wherein said bio-residue is isolated from bio-oil produced from animal waste.

In yet another variation, the present application discloses a bio-adhesion promoter comprising a bio-adhesive composition disclosed herein, optionally wherein the bio-adhesive composition comprises at least about 5% by weight amide-containing compounds. In another variation, the present application discloses an asphalt bio-extender comprising a bio-adhesive composition as disclosed herein optionally in combination with an asphalt binder. In one variation, the present application discloses a bio-rejuvenator for asphalt compositions, the bio-rejuvenator comprising a bio-adhesive composition as disclosed herein, optionally in combination with an asphalt binder. The present application also discloses a bio-modified binder comprising a bio-adhesive composition disclosed herein.

Also disclosed herein is a bio-modified composition comprising a bio-adhesive composition disclosed herein optionally in combination with asphalt, further optionally wherein the asphalt is recycled asphalt. Further disclosed herein is a rubber-containing bio-asphalt composition comprising a bio-adhesive composition as disclosed herein, in combination with rubber and optionally comprising an asphalt binder and/or an aggregate other than rubber. Also disclosed herein is a nanoclay-containing bio-asphalt comprising a bio-adhesive composition as disclosed herein in combination with nanoclay and optionally comprising an asphalt binder and/or an aggregate other than nanoclay.

In one aspect, the present application discloses a method of making bio-modified asphalt composition comprising contacting components for an asphalt composition with a bio-adhesion promoter disclosed herein. In another aspect, the present application discloses a method of making a bio-modified asphalt composition comprising contacting components for an asphalt composition with an asphalt bio-extender as disclosed herein. The present application also discloses a method of rejuvenating asphalt pavement, comprising contacting an asphalt composition with a bio-rejuvenator disclosed herein. In another aspect, the present application discloses a method of covering a surface with a bio-modified asphalt composition, comprising contacting the surface with a composition disclosed herein, optionally wherein the surface is a roof, a road, a floor, a crack or a joint. In yet another aspect, the present application discloses a method of sealing a crack or joint in asphalt pavement comprising applying a bio-modified composition disclosed herein.

In one aspect, the present application discloses a method of isolating a bio-adhesive composition from a bio-oil, the method comprising: (a) providing a bio-oil derived from animal waste; (b) distilling the bio-oil to remove a light liquid fraction, wherein the distilling occurs at a vacuum pressure of between about 1 mm Hg and about 80 mm Hg while heating at a rate of between about 5° C. per hour and about 50° C. to a temperature of up to 60° C.; (c) isolating a bio-adhesive composition from the bio-oil under conditions such that the viscosity of the bio-adhesive composition is not allowed to exceed 1 centipoise (cP) at 135° C.

In another aspect, the present application discloses a method of isolating a bio-adhesive composition from a bio-oil, the method comprising: (a) providing a bio-oil derived from animal waste; (b) distilling the bio-oil to provide a distilled heavy liquid fraction and a bio-residue that is not distilled, wherein the distilling occurs under vacuum pressure while heating at a rate of between about 5° C. per hour and about 50° C. per hour to (1) a temperature ranging from 60° C. to 100° C., or (2) a temperature ranging from 100° C. to 160° C., wherein the viscosity of the bio-residue is not allowed to exceed 1 cP at 135° C.; and (c) isolating the bio-adhesive composition comprising the heavy liquid fraction.

In yet another aspect, the present application discloses a bio-adhesive composition produced by any of the methods disclosed herein. In one variation, the present application is directed to a bio-adhesive composition, comprising a heavy liquid fraction and a bio-residue, wherein the composition has a viscosity of about 0.5 cP at 135° C. wherein said heavy liquid fraction and bio-residue is isolated from bio-oil produced from animal waste and wherein said bio-adhesive composition does not contain a light liquid fraction. In another variation, the present application is directed to a bio-adhesive composition, comprising a heavy liquid fraction having a viscosity of between about 0.1 cP and 0.5 cP at 135° C., optionally, between about 0.2 cP and about 0.5 cP, wherein said bio-adhesive composition does not contain a light liquid fraction. In another variation, the present application is directed to a bio-adhesive composition, comprising a bio-residue having a viscosity of at least about 0.4 cP, optionally between about 0.5 cP and 1 cP, at 135° C., wherein said bio-adhesive composition does not contain a light liquid fraction.

The present application further discloses a bio-adhesion promoter comprising a bio-adhesive composition disclosed herein. In yet another aspect, the present application discloses a method of making bio-modified asphalt composition, comprising contacting components for an asphalt composition with a bio-adhesion promoter as disclosed herein.

The present application additionally discloses an asphalt bio-extender comprising a bio-adhesive composition disclosed herein and optionally an asphalt binder. In a further aspect, the present application discloses a method of making a bio-modified asphalt composition, comprising contacting components for an asphalt composition with an asphalt bio-extender disclosed herein.

The present application further discloses a bio-rejuvenator comprising a bio-adhesive composition disclosed herein and optionally an asphalt binder. In yet another aspect, the present application discloses a method of rejuvenating asphalt pavement, comprising contacting an asphalt composition with a bio-rejuvenator as disclosed herein.

In yet another aspect, the present application discloses a bio-modified binder comprising a bio-adhesive composition disclosed herein, and optionally containing asphalt.

In one aspect the present application discloses a rubber-containing bio-asphalt composition comprising a bio-adhesive composition as disclosed herein, rubber and optionally an asphalt binder. In another aspect, the present application discloses nanoclay-containing bio-asphalt comprising a bio-adhesive composition as disclosed herein, nanoclay and optionally an asphalt binder. In one variation, the present application discloses a method of covering a surface with a bio-modified asphalt composition, comprising contacting the surface with a composition disclosed herein. In another variation, the present application discloses a method of sealing a crack or joint in asphalt pavement comprising applying a bio-modified composition as disclosed herein.

These and other objects and aspects of the present inventions will become apparent to those skilled in the art after a reading of the following description of the disclosure when considered with the drawings.

BRIEF DESCRIPTION OF THE DRAWINGS

FIG. 7B-2 is an expanded version of FIG. 7B-1 showing the relationship between temperature in the viscosity range 0.1 to 1.0 Pa·s$^{-1}$.

It will be understood that the drawings are for the purpose of describing a preferred embodiment of the inventions and are not intended to limit the inventions thereto.

DETAILED DESCRIPTION

Figure 1A:
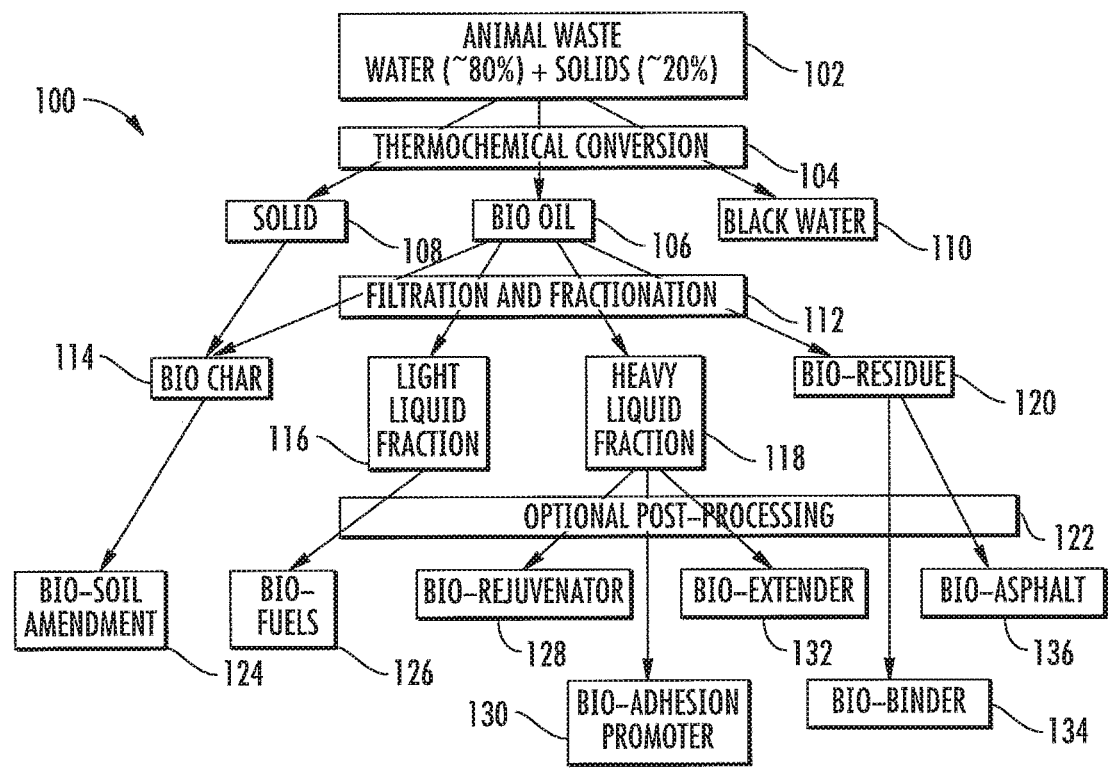
FIG. 1A and FIG. 1B provide schematics summarizing processing and corresponding products/components in accordance with the presently disclosed subject matter.
Figure 1B:
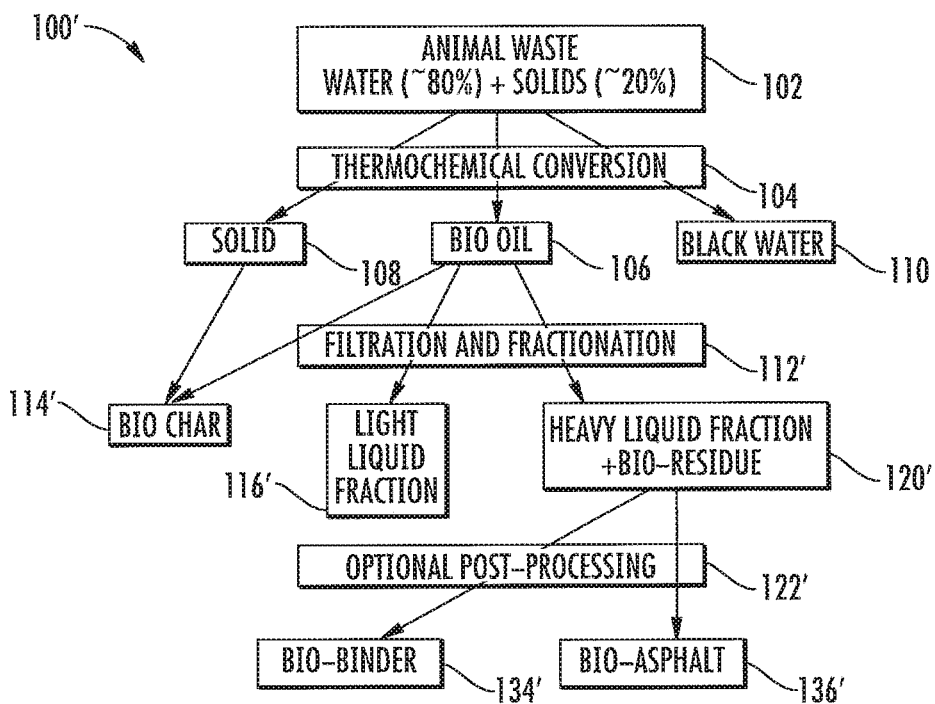

Referring now to FIGS. 1A and 1B, representative process flows in accordance with the presently disclosed subject matter are schematically presented, and generally referred to as 100 and 100'. Animal waste 102 (typically composed of 80% water and 20% solids) is subjected to thermochemical conversion 104 to produce solid 108, bio-oil 106 and black water 110. Solid 108 and bio-oil 106 are subjected to filtration and fractionation 112. Filtration and fractionation 112 produces bio-char 114 from solid 108 and bio-oil 106. Additionally, filtration and fractionation 112 produces a light liquid fraction 116, a heavy liquid fraction 118 and a bio-residue 120 from bio-oil 106. Bio-char 114 can be provided for bio-soil amendment 124. Light liquid fraction 116, heavy liquid fraction 118, and bio-residue 120 can be subject to optional post-processing 122 to produce biofuels 126, bio-rejuvenator 128, bio-adhesion promoter 130, bio-extender 132, bio-binder 134, and bio-asphalt 136.

Referring particularly to FIG. 1B, bio-oil 106 can be subjected to alternative filtration and fractionation 112', described herein below, to produce light liquid fraction 116' and heavy liquid fraction plus bio-residue 120'. Heavy liquid fraction plus bio-residue 120' can be subjected to optional post-processing 122' to produce bio-binder 134' and bio-asphalt 136', in accordance with approaches also set forth herein below.

Figure 2:
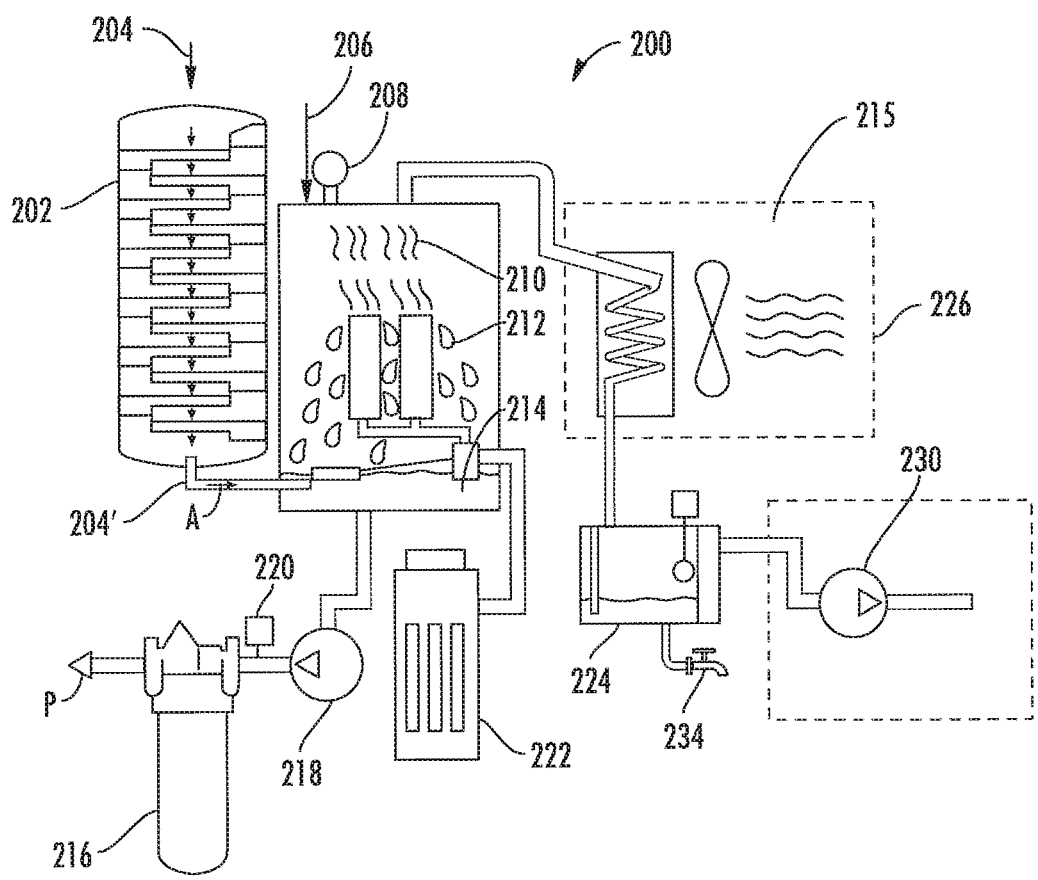
FIG. 2 provides a general schematic outlining of one possible processing equipment arrangement for the input of raw materials and the output of the targeted components. Such a process can be continuous or batch and can be completed by interconnected equipment or separately configured equipment depending on the available facilities and identified needs.

Referring now to FIG. 2, a system for preparing a bio-adhesive composition in accordance with the presently disclosed subject matter is referred to generally at 200. System 200 includes filtration tank 202 wherein a mixture 204 of bio-oil plus solvent plus bio-char material is loaded. After filtration, removing biochar (108 in FIG. 1) filtrate 204' is transferred in the direction of arrow A into vacuum chamber 206 for vacuum distillation. Vacuum gauge 208 is used to monitor pressures in vacuum chamber 206. Heater 222 provides heat to vacuum chamber 206. Filtrate 204" forms fractions: a solvent fraction 210, a Light Liquid Fraction 212 and Heavy Liquid Fraction/bioresidue 214. In some embodiments, solvent fraction 210, Light Liquid Fraction 212, and Heavy Liquid Fraction 214 flow into condenser 215 for further processing as disclosed herein below. In some embodiments, Heavy Liquid Fraction/bioresidue 214 is pumped into desiccator 216 via discharge pump 218, which is controlled by low flow switch 220. A product P flows out of desiccator 216 for isolation.

Continuing with reference to FIG. 2, in some embodiments, condensed Light Liquid Fraction 212 and condensed Heavy Liquid Fraction 214 sequentially flow into tank 224, which is in flow communication with condenser 215 via high level switch 226. Each liquid condensate is drained from tank 224 via valve 234 for isolation. Alternatively or in addition, each liquid condensate from tank 224 is pumped into second vacuum chamber 230 for further processing and interactions as disclosed herein below.

In accordance with the present application and as used herein, the following terms are defined with the following meanings, unless explicitly stated otherwise.

"Thermochemical conversion" or "thermochemical liquefaction" refers to the process converting a liquid slurry of biomass and organic materials to hydrocarbon oils and byproducts using high pressure (generally between about 15 MPa and 20 MPa) and temperature (generally up to 350° C.) in a zero or low oxygen atmosphere. By-products typically include solids and an aqueous fraction. The quantity and quality of the end-products are typically dependent on the reactor system used and feedstock characteristics.

As used herein, "bio-oil" refers to an oil produced from animal waste comprising beef, dairy, swine, poultry, sheep manures, or combinations thereof. The oil is typically an energy-dense crude oil that is similar to petroleum extracts.

As used herein, "black water" refers to the aqueous side-product from the production of bio-oil via the thermochemical conversion of animal waste. Black water contains nutrients, but no pathogens, and has been identified as a useful fertilizer.

As used herein, "bio-char" refers to the insoluble organic material isolated from the production and post-processing of the bio-oil, as described herein. Typically bio-char contains nutrients, including but not limited to carbon, metals, sand solid minerals comprising, amongst others, elements such as nitrogen, phosphorus, potassium, and calcium.

As used herein "Light Liquid Fraction" refers to liquid compounds within bio-oil that have relatively low boiling point at 3 mm mercury (Hg), generally up to 60° C. The Light Liquid Fraction typically contains olefin compounds and is usually an odorous fraction. The molecules in the fraction include, but are not limited to hexadecanamide, tetradecanal o-methyloxime, and octadecanoic acid. The Light Liquid Fraction has applications as sources of energy, including but not limited to transportation fuel, heating fuel, and use in creating electricity, optionally in conjunction with a methane digester.

As used herein "Heavy Liquid Fraction" refers to liquid compounds within bio-oil that have mid-range boiling points at 3 mm Hg, typically over 60° C., generally from 60° C. to 100° C. and from 100° C. to 160° C. These compounds are liquid at room temperature and have adhesion characteristics to certain surfaces (substrates). They have apparent dynamic viscosity of up to about 0.5 cP at 135° C., generally between about 0.1 cP and about 0.5 cP. This fraction can have a slight sulfurous odor. The Heavy Liquid Fraction can be isolated as a series of sub-fractions, for example, a fraction containing hydrocarbons with a high concentration of amide groups, for example at least about 5% or at least about 10%, or at least about 15% by weight amide containing compounds. Alternately, one Heavy Liquid Fraction contains between about 10% and about 20% amide containing compounds. Alternately a Heavy Liquid Fraction contains a low concentration of amide groups, for example no more than about 10% amide-containing compounds or no more than about 5% amide-containing compounds or nor more than about 2% amide containing compounds. The isolation of these Heavy Liquid sub-Fractions depends on the isolation methods used, as disclosed herein.

As used herein, "bio-residue" refers to a dark brown to black sticky material that is solid at room temperature with penetration grade between (25-60) at 25° C. Typically the bio-residue is non-odorous at room temperature and has a slight sulfurous odor at elevated temperatures. Generally bio-residue contains compounds that are highly polar, have low aromaticity, including some olefinic compounds, and those with a lower molecular weight.

Generally, the viscosity of the bio-residue is targeted to be less than 5.0 cP at 135° C. In one embodiment, the bio-residue has a viscosity of at least about 0.1 cP, at least about 0.05 cP at 135° C., or at least about 0.1 cP; alternately the bio-residue has a viscosity of at least about 0.2 cP, at least about 0.3 cP, or at least about 0.4 cP at 135° C. In one variation, the bio-residue has a viscosity of at least 0.5 cP at 135° C. In another embodiment, at 135° C. the bio-residue has a viscosity of at least about 0.6 cP, at least about 0.7 cP, at least about 0.8 cP, at least about 0.9 cP, at least about 1 cP, or at least about 1.5 cP. In yet another embodiment, the bio-residue at 135° C. has a viscosity of no more than about 2 cP, no more than about 3 cP, no more than about 4 cP, or no more than about 5 cP. In one alternative, the bio-residue has a viscosity of between about 0.1 cP and about 3 cP at 135° C. In another alternative, the bio-residue has a viscosity of between about 0.3 cP and about 2 cP or between about 0.5 and about 1 cP at 135° C.

As used herein, "bio-adhesive" refers to a group of compounds that can be isolated from bio-oil prepared from animal waste; typically bio-adhesives have a viscosity between about 0.01 cP and about 5 cP at 135° C. In one embodiment, the source of the animal waste is cattle, swine, poultry, sheep or combinations thereof. In another embodiment, the animal waste comprises beef manure, dairy manure, swine manure, sheep manure, poultry manure or combinations thereof. In yet another embodiment, the animal waste comprises poultry manure. In another embodiment, the animal waste comprises beef or dairy manure. In yet another embodiment, the animal waste comprises sheep manure. In another embodiment, the animal waste comprises swine manure.

In one embodiment, the minimal percentage of animal waste that is solid manure waste, as opposed to liquid waste, straw, grass etc., is at least 2.5% by weight or alternately about 5% by weight. In another embodiment, the percentage of solid manure waste is at least about 10% by weight, at least about 15%, at least about 20%, at least about 25% or at least about 30% by weight. The liquid component of animal waste can be removed or alternately its amount reduced by a variety of methods, including but not limited to, filtration, centrifugation, condensation, gravimetry and other methods familiar to those of skill in the art for separating solids and liquids. In one embodiment, the animal waste is processed by thermochemical liquefaction. In another embodiment, animal waste is processed by chemical reactions in presence of a catalyst, including, but not limited to gasification, anaerobic digestion or fast pyrolysis. Alternately, the animal waste is processed though a digester leading to side products, that can be used as a feedstock for the production of bio-oil, for example a centroid from a methane digester and/or glycerol from bio-diesel production Generally, the viscosity of the bio-adhesive is targeted to be less than 5.0 cP at 135° C. In one embodiment, the bio-adhesive has a viscosity of about 0.01 cP, about 0.05 cP at 135° C., or about 0.1 cP; alternately the bio-adhesive has a viscosity of about 0.2 cP, about 0.3 cP, or about 0.4 cP at 135° C. In one variation, the bio-adhesive has a viscosity of 0.5 cP at 135° C. In another embodiment, at 135° C. the bio-adhesive has a viscosity of about 0.6 cP, about 0.7 cP, about 0.8 cP, about 0.9 cP or about 1 cP. In yet another embodiment, the bio-adhesive at 135° C. has a viscosity of about 2 cP or about 3 cP or about 4 cP or about 5 cP. In one alternative, the bio-adhesive has a viscosity of between about 0.01 cP and about 3 cP at 135° C. In another alternative, the bio-adhesive has a viscosity of between about 0.01 cP and about 1 cP, between about 0.01 cP and about 0.5 cP or between about 0.1 and 0.3 cP at 135° C. Alternately, the bio-adhesive has a viscosity of up to about 1 cP or up to about 0.5 cP or up to about 0.3 cP at 135° C.

As used herein "bio-adhesion promoter" refers to one industrial application of a bio-adhesive prepared according to the methods of the present application, in which the bio-adhesion promoter improves the interaction between asphalt and the aggregates comprising asphalt concrete as disclosed herein. Typically, the bio-adhesion promoter is isolated as part of the Heavy Liquid Fraction. Usually, the bio-adhesion promoter is comprised of at least about 5% by weight amide containing compounds. In one embodiment, the bio-adhesion promoter is comprised of at least about 10% amide containing compounds or at least about 15% amide containing compounds. In another embodiment, the bio-adhesion promoter is comprised of between about 5% and about 20% amide containing compounds; alternately, the bio-adhesion promoter is comprised of between about 10 and about 15% amide containing compounds. Generally, the bio-adhesive component with the targeted viscosities and amide concentrations are combined with bitumen to yield an industrially useful bio-adhesion promoter. Usually the bio-adhesive component is combined at about 1% to about 10% by weight with bitumen, for example the bio-adhesive component is combined at about 1% or about 2% or about 3% or about 4% or about 5% or about 6% or about 7% or about 8% or about 9% or about 10% by weight with bitumen.

Typically, a successful bio-adhesion promoter of the present application has a viscosity between about 0.01 cP and about 3 cP at 135° C. Alternately, the bio-adhesion promoter has a viscosity of about 0.01 cP, about 0.05 cP at 135° C., or about 0.1 cP; alternately the bio-adhesion promoter has a viscosity of about 0.2 cP, about 0.3 cP, about 0.4 cP or 0.5 cP at 135° C. In another embodiment, at 135° C. the bio-adhesion promoter has a viscosity of about 0.6 cP, about 0.7 cP, about 0.8 cP, about 0.9 cP or about 1 cP. In yet another embodiment, the bio-adhesion promoter at 135° C. has a viscosity of about 2 cP or about 2.5 cP. In one alternative, the bio-adhesion promoter has a viscosity of between about 0.05 cP and about 2 cP at 135° C. In another alternative, the bio-adhesion promoter has a viscosity of between about 0.1 cP and about 1.5 cP or between about 0.1 cP and about 0.5 cP at 135° C. Alternately, the bio-adhesion promoter has a viscosity of up to about 1 cP or up to about 0.5 cP. Bio-adhesion promoters having the targeted viscosity and/or amide concentration can be prepared according to the methods of the present application.

As used herein "asphalt bio-extender" refers to one industrial application of a bio-adhesive prepared according to the methods of the present application, in which the asphalt bio-extender enables the recycling of asphalt waste, such as RAP or RAS, as well as incorporating natural asphalt sources, including but not limited to, rock asphalt, tar sands, Gilsonite, and Trinidad Lake Asphalt. Asphalt bio-extenders generally enable a larger amount of asphalt waste material to be used in a performance grade asphalt mix, yielding a product having targeted mechanical and physical properties. Typically, the asphalt bio-extender is isolated as part of the Heavy Liquid Fraction.

Typically, a successful asphalt bio-extender has a viscosity between about 0.01 cP and about 1 cP at 135° C. Alternately, the asphalt bio-extender has a viscosity of about 0.01 cP, about 0.05 cP at 135° C., or about 0.1 cP; alternately the asphalt bio-extender has a viscosity of about 0.2 cP, about 0.3 cP, about 0.4 cP or 0.5 cP at 135° C. In one embodiment, at 135° C. the asphalt bio-extender has a viscosity of about 0.6 cP, about 0.7 cP, about 0.8 cP, about 0.9 cP or about 1 cP. In yet another embodiment, the asphalt bio-extender has a viscosity of between about 0.01 cP and about 0.5 cP at 135° C. In another alternative, the asphalt bio-extender has a viscosity of between about 0.1 cP and about 0.5 cP or between about 0.2 cP and about 0.5 cP at 135° C. Alternately, the asphalt bio-extender has a viscosity of up to about 1 cP or up to about 0.5 cP. Asphalt bio-extenders having the targeted viscosity can be prepared according to the methods of the present application.

The asphalt bio-extender disclosed herein is generally combined with asphalt in the refinery, at the blending terminal or some combination thereof. It can also be introduced to reclaimed asphalt pavement and recycled asphalt shingles in an amount sufficient to eliminate the adverse stiffening effects of the reclaimed/recycled/asphalt from pavement and/or tear-off and/or manufactured scrap roofing shingles. The bio-asphalt extender is typically present in an amount of about 5% to about 75% by weight, or in an amount from about 15% to about 50% by weight, or in an amount from about 10% to about 40% by weight, of the total liquid asphalt needed for performance grade asphalt mix. In turn, the amount of liquid asphalt is from about 25% to about 95% of the total weight of the final performance graded asphalt mix. The amount asphalt waste material is from about 2% to about 45% of the total weight of the performance graded asphalt mix; or from about 8% to about 35% of the total weight of the performance graded asphalt mix; or from about 10% to about 25% of the total weight of the performance graded asphalt mix. The amount of aggregate comprises from about 50% to about 95% of the total weight of the performance grade asphalt mix, as typically identified in AASHTO standards. The mixing temperature at which asphalt bio-extender is blended with the asphalt, reclaimed/recycled asphalt, and aggregate is generally from about 80° F. to about 300° F.

As used herein "asphalt bio-rejuvenator" refers to one industrial application of the bio-adhesive prepared according to the methods of the present application, in which the asphalt bio-rejuvenator is used to for one or more of the following: stops and/or reverses shrinking, inhibits pitting and/or raveling, and reduces air and/or water permeability. Typically, bio-rejuvenator inhibits processes leading to pavement degradation. Usually, the asphalt bio-rejuvenator is isolated as part of the Heavy Liquid Fraction.

Typically, a successful asphalt bio-rejuvenator has a viscosity between about 0.01 cP and about 3 cP at 135° C. Alternately, the bio-rejuvenator has a viscosity of about 0.01 cP, about 0.05 cP at 135° C., or about 0.1 cP; alternately the bio-rejuvenator has a viscosity of about 0.2 cP, about 0.3 cP, about 0.4 cP or 0.5 cP at 135° C. In another embodiment, at 135° C. the bio-rejuvenator has a viscosity of about 0.6 cP, about 0.7 cP, about 0.8 cP, about 0.9 cP or about 1 cP. In yet another embodiment, the bio-rejuvenator at 135° C. has a viscosity of about 2 cP or about 2.5 cP. In one alternative, the bio-rejuvenator has a viscosity of between about 0.01 cP and about 3 cP at 135° C. In another alternative, the bio-rejuvenator has a viscosity of between about 0.1 cP and about 0.5 cP or between about 0.2 cP and about 0.5 cP at 135° C. Alternately, the bio-rejuvenator promoter has a viscosity of up to about 1 cP or up to about 0.5 cP at 135° C. Asphalt bio-rejuvenator having the targeted viscosity can be prepared according to the methods of the present application.

As used herein "bitumen" or "asphalt" is the sticky, black and highly viscous liquid or semi-solid present in most crude petroleum and in some natural deposits. Asphalt is used in asphalt binders, adhesion promoters, asphalt rejuvenators, asphalt extenders, as well as asphalt mixtures with nanoclay or rubber. In addition, asphalt can also be used in roofing, soil stabilization, crack and joint sealing and carpeting as a hot-melt adhesive and to enhance U.V. protection in case of roofing. In such specialty products asphalt has been shown to be an effective base material.

As used herein "bio-asphalt" refers to an industrial application of the bio-adhesive prepared according to the methods of the present application, in which the bio-adhesive is used as a stand-alone bio-degradable product having some of the properties of petroleum-based asphalt, such as viscosity and stickiness. Typically the uses of bio-asphalt encompass known uses of petroleum-based asphalt, including but not limited to roofing, soil stabilization, crack and joint sealing, flooring adhesives and roofing.

Typically the bio-adhesive employed as a bio-asphalt (referred to at 136 in FIG. 1A) is isolated from the bio-residue (referred to at 120 in FIG. 1A), as represented in FIG. 1A. Generally in this example, a successful bio-asphalt has a viscosity between about 0.4 cP and about 5 cP at 135° C. Alternately, the bio-asphalt at 135° C. has a viscosity of about 0.5 cP, about 1 cP, about 1.5 cP, about 2 cP or about 2.5 cP or about 3 cP or about 3.5 cP or about 4 cP or about 4.5 cP. In one alternative, the bio-asphalt has a viscosity of between about 0.5 cP and about 1 cP at 135° C. In another alternative, the bio-asphalt has a viscosity of between about 0.4 cP and about 2.5 cP or about 0.5 cP and about 1.5 cP at 135° C. Alternately, the bio-asphalt has a viscosity of up to about 2.5 cP or up to about 1 cP or up to about 0.5 cP at 135° C. A bio-asphalt having the targeted viscosity can be prepared according to the methods of the present application.

Alternately, the bio-adhesive employed as a bio-asphalt (referred to at 136' in FIG. 1B) is isolated from un-separated combination of bio-residue and Heavy Liquid Fraction (referred to at 120' in FIG. 1B), as represented in FIG. 1B. Typically in this example, a successful bio-asphalt has a viscosity between about 0.1 cP and about 5 cP at 135° C. Alternately, the bio-asphalt has a viscosity of about 0.2 cP, about 0.3 cP, about 0.4 cP or 0.5 cP at 135° C. In another embodiment, at 135° C. the bio-asphalt has a viscosity of about 0.6 cP, about 0.7 cP, about 0.8 cP, or about 0.9 cP. Alternately, the bio-asphalt at 135° C. has a viscosity of about 1 cP, about 1.5 cP, about 2 cP or about 2.5 cP or about 3 cP or about 3.5 cP or about 4 cP or about 4.5 cP. In one alternative, the bio-asphalt has a viscosity of between about 0.1 cP and about 1 cP at 135° C. In another alternative, the bio-asphalt has a viscosity of between about 0.5 cP and about 1 cP at 135° C. In yet another alternative, the bio-asphalt has a viscosity of between about 0.4 cP and about 2.5 cP or about 0.5 cP and about 1.5 cP at 135° C. Alternately, the bio-asphalt has a viscosity of up to about 2.5 cP, up to about 1 cP or up to about 0.5 cP. A bio-asphalt having the targeted viscosity can be prepared according to the methods of the present application.

In one variation, the bio-residue of the present application is used without the addition of any petroleum-based adhesive, generally as a bio-asphalt. Alternately, bio-residue of the present application optionally can be combined with modifiers selected from the group including but not limited to nanoclay and rubber. In one variation, the bio-residue is blended with nanoclay to yield a nanoclay-containing bio-asphalt, which is typically a brittle material used in molding vases, low cost containers, animal feed containers, sport goods, etc. In another variation the bio-residue is blended with rubber to yield a rubber-containing bio-asphalt, which is typically a flexible material with higher strength length. Rubber-containing bio-asphalt has applications in sealing cracks and joints, which generally requires high elasticity.

As used herein "asphalt concrete" refers to a composite containing asphalt and aggregate, prepared using standard methods, including warm mix, semi-cold mix, cold mix, and hot mix asphalt technologies.

The term "aggregate" refers to materials such as stone aggregate, crushed stone, tar sands, slag, natural sand, stone sand, stone dust, soil, or similar materials. Aggregate can optionally further contain and rubber-based material, including but not limited to ground rubber, crumb rubber, virgin rubber, or similar materials.

The phrase "asphalt binder" or "petroleum binder," as used herein is generally consistent with the meaning provided by AASHTO M320 or ASTM D-6373. The asphalt binder material may be derived from any asphalt source, such as natural asphalt, rock asphalt, produced from tar sands, or petroleum-based asphalt. The asphalt binder may be selected from those currently graded by AASHTO M320 and ASTM D-6373, including Performance Graded Asphalt Binders.

As used herein, a "binder mixture" may contain a petroleum-based asphalt binder, a polymer-based asphalt binder additive, or combinations thereof. Asphalt binders may further include a blend of various asphalts not meeting any specific grade definition, including air-blown asphalt, vacuum-distilled asphalt, steam-distilled asphalt, cutback asphalt or roofing asphalt. Alternatively, synthetic binders, such as gilsonite (natural or synthetic) can be used alone or mixed with petroleum asphalt as a binder. When asphalt binder mixtures contain a bio-adhesive prepared according to the methods of the present application, such mixtures are typically referred to as "bio-modified asphalt mixtures" (BMAM).

As used herein "bio-binder" refers to an industrial application of the bio-adhesive prepared according to the methods of the present application, in which the bio-adhesive has a minimum viscosity of about 0.3 cP at 135° C., usually a measured viscosity of about 0.5 cP at 135° C. Typically the bio-residue (referred to at 120 in FIG. 1A) from bio-oil (referred to at 106 in FIG. 1A) is employed as a bio-binder ((referred to at 134 in FIG. 1A)), in which the viscosity is at least about 0.5 cP at 135° C. Alternately, according to another variation in the current application, the Heavy Liquid Fraction and the bio-residue (referred to at 120' in FIG. 1B) are not fully separated in post-processing and the mixture of components is employed as a bio-binder ((referred to at 134' in FIG. 1B)), in which the viscosity is between about 0.1 cP and about 5 cP at 135° C. In another variation, the viscosity is up to about 2.5 cP or up to about 1 cP or up to about 0.5 cP.

Typically the bio-adhesive employed as a bio-binder (referred to at 134 in FIG. 1A) is isolated from the bio-residue (referred to at 120 in FIG. 1A), as represented in FIG. 1A. Generally in this example, a successful bio-binder has a viscosity between about 0.5 cP and about 5 cP at 135° C. Alternately, the bio-binder at 135° C. has a viscosity of about 1 cP, about 1.5 cP, about 2 cP or about 2.5 cP or about 3 cP or about 3.5 cP or about 4 cP or about 4.5 cP. In one alternative, the bio-binder has a viscosity of between about 0.5 cP and about 1 cP at 135° C. In another alternative, the bio-binder has a viscosity of between about 0.4 cP and about 2.5 cP or about 0.5 cP and about 1.5 cP at 135° C. In yet another alternative, the bio-binder has a viscosity of between about 0.5 cP and about 0.75 cP at 135° C. Alternatively, the bio-binder has a viscosity of up to about 2.5 cP, up to about 1 cP or up to about 0.5 cP at 135° C. A bio-binder having the targeted viscosity can be prepared according to the methods of the present application.

Alternately, the bio-adhesive employed as a bio-binder (referred to at 134' in FIG. 1A) is isolated from unseparated combination of bio-residue and Heavy Liquid Fraction (referred to at 120' in FIG. 1A), as represented in FIG. 1B. Typically in this example, a successful bio-binder has a viscosity between about 0.1 cP and about 5 cP at 135° C. Alternately, the bio-binder has a viscosity of about 0.2 cP, about 0.3 cP, about 0.4 cP or 0.5 cP at 135° C. In another embodiment, at 135° C. the bio-binder has a viscosity of about 0.6 cP, about 0.7 cP, about 0.8 cP, or about 0.9 cP. Alternately, the bio-binder at 135° C. has a viscosity of about 1 cP, about 1.5 cP, about 2 cP or about 2.5 cP or about 3 cP or about 3.5 cP or about 4 cP or about 4.5 cP. In one alternative, the bio-binder has a viscosity of between about 0.1 cP and about 1 cP at 135° C. In another alternative, the bio-binder has a viscosity of between about 0.3 cP and about 0.8 cP at 135° C. Alternately, the bio-binder has a viscosity of up to about 2.5 cP, up to about 0.8 cP or up to about 0.5 cP. A bio-binder having the targeted viscosity can be prepared according to the methods of the present application.

As used herein, "bio-modified binder" (BMB) refers to an asphalt binder combined with the bio-binder of the present application. In one embodiment the BMB comprises at least about 2% by weight bio-binder. In another embodiment the bio-binder is combined with asphalt binder up to about 50% by weight of the final BMB, alternately at between about 2% and about 50% by weight of the final BMB. In one variation, the BMB comprises between about 5% and about 45%, between about 10% and about 40%, between about 15% and about 35%, or between about 20% and about 30% bio-binder. In one variation, the BMB comprises at least about 2% or at least about 5% or at least about 10% or at least about 15% or at least about 20% or at least about 25% or at least about 30% or at least about 35% or at least about 40% or at least about 45% or at least about 50% bio-binder.

Asphalt binders, prior to combination with bio-binder, can be characterized by their temperature performance range, which is usually 86° C. Familiar to those of skill in the art, PG rating refers to Super Pave (Superior Performing Pavements) Performance Graded (PG) binder specifications as developed in the United States through research funded by the Association of American Highway and Transportation Officials (AASHTO M320). PG ratings, e.g. PG 64-22, are identified by a first number, (64) which is equivalent to the maximum 7 day temperature (in ° C.) for which the binder is tested; the second number (−22) is the minimum temperature (in ° C.) at which cracking caused by low temperatures is not observed. Typically, commercial asphalt binders have a PG rating of PG 64-22, PG 52-28, or PG 52-34, etc. Combining commercial and non-commercial asphalt binders with the bio-binder of the present application leads to a bio-modified binder, which is eco-friendly and has a broader PG range and/or allows asphalt binders having a broader temperature performance range to be industrially useful. For example, a BMB containing PG 64-28 (with 92° C. useful temperature interval) can be prepared by blending BMB with PG 64-22 (with 86° C. useful temperature interval).

As used herein, "RAP" refers to Reclaimed Asphalt Pavements, the term typically given to removed and reprocessed pavement materials containing asphalt and aggregates. RAP generally contains 3%-7% asphalt by weight. RAP is usually used in surface asphalt mixtures at no more than 20%, due to limitations on the resulting asphalt quality. Without being bound by theory, it is believed that the aged binder in RAP is one of the factors leading to increased mixture stiffness. Addition of BMB can facilitate blending of the aged binder in RAP and virgin binder allowing for introduction of about 20%-30% higher RAP into the mixture, so for example the amount of RAP used in surface asphalt mixtures comprising bio-binder can range from about 20% up to about 50%. The percent of RAP in the mixture can be at least about 25%, at least about 30%, at least about 35%, at least about 40%, at least about 45% or at least about 50% of the overall surface asphalt mixture.

As used herein "RAS" refers to recycled asphalt shingles. RAS are generally composed of 30%-35% asphalt cement by weight. RAS is usually used in surface asphalt mixtures at no more than 5%, due to limitations on the resulting asphalt quality. Without being bound by theory, it is believe that the aged binder in RAS is one of the factors leading to increased mixture stiffness, analogous to aged RAP. Addition of BMB can facilitate blending of the aged binder in RAS and virgin binder allowing for introduction of about 10%-15% higher RAS into the mixture, so for example the amount of RAS used in surface asphalt mixtures comprising bio-binder can range from about 5% up to about 20%. The percent of RAS in the mixture can be at least about 10%, at least about 15%, or at least about 20% of the overall surface asphalt mixture.

"Rubber" as used herein generally refers to recycled rubber, but can also include proportions of virgin rubber. A typical, but not exclusive, source of recycled rubber is used tires.

The present application generally discloses a method of vacuum distillation that can separate industrially useful fractions of bio-oil while controlling the viscosity of the resulting commercially relevant residue.

As disclosed herein, and referring to FIGS. 1A and 1B, process flows for converting animal waste are referred to generally as 100 and 100'. In processes 100 and 100' animal waste 102 can be converted to bio-oil 106 using methods known to those of skill in the art, including, but not limited to thermochemical liquefaction and catalyzed chemical modification, referred to at 104 in FIGS. 1A and 1B. The resulting bio-oil 106 can then be processed according to processes 100 and 100' to produce a variety of industrially useful components, including but not limited to: bio-char 114, a light liquid component 116, a heavy liquid component 118, and a bio-adhesive residue 120. In one variation, the processing of bio-oil 106 comprises adding a solvent, such as acetone or an acetone/toluene mix to the product of the thermochemical liquefaction, a mixture of bio-char+bio-oil and transferring to mixture to a filtration device (all of which are referred to schematically at 112 and 112' in FIGS. 1A and 1B), which separates out the insoluble bio-char 114 and 114'. The bio-oil 106 in solution is transferred to a vacuum distillation apparatus (referred to schematically at 112 and 112' in FIGS. 1A and 1B and at 206 in FIG. 2). The apparatus is set to a pressure of between about 1 mm Hg and about 80 mm Hg. Alternately the pressure of the apparatus can be set to at least about 1 mm Hg, at least about 2 mm Hg, at least about 3 mm Hg, at least about 4 mm Hg, at least about 5 mm Hg, at least about 6 mm Hg, at least about 7 mm Hg, at least about 8 mm Hg, at least about 9 mm Hg or at least about 10 mm Hg. In another variation the pressure of the apparatus can be set to no more than about 20 mm Hg, no more than about 30 mm Hg, no more than about 40 mm Hg, no more than about 50 mm Hg, no more than about 60 mm Hg, no more than about 70 mm Hg or no more than about 80 mm Hg. In another variation, the apparatus is heated at a rate of between about 5° C. per hour and about 50° C. per hour to a final temperature of between about 130° C. and about 250° C. In one variation, the heating rate is between about 10° C. per hour and about 45° C. per hour, alternately between about 15° C. per hour and about 40° C. per hour, or between about 20° C. per hour and about 35° C. per hour, or between about 25° C. per hour and about 30° C. per hour. In another variation, the heating rate is no more than about 5° C. per hour, no more than about 10° C. per hour, no more than about 15° C. per hour, no more than about 20° C. per hour, no more than about 25° C. per hour, no more than about 30° C. per hour, no more than about 35° C. per hour, no more than about 40° C. per hour, no more than about 45° C. per hour or no more than about 50° C. per hour. In one variation, the temperature is not raised above about 130° C., or above about 140° C., or above about 150° C., or above about 160° C., or above about 170° C., or above about 180° C., or above about 190° C., or above about 200° C., or above about 210°

C., or above about 220° C., or above about 230° C., or above about 240° C., or above about 250° C. In one embodiment, the pressure range is between about 1 mm Hg and about 5 mm Hg and the temperature heating rate is no more than about 30° C. per hour to a final temperature of no more than about 160° C., alternately to a final temperature of no more than about 100° C. In another embodiment, the pressure range is between about 2 mm Hg and about 10 mm Hg and the heating rate is no more than about 15° C. per hour to a final temperature of not more than about 170° C., alternately to a final temperature of no more than about 130° C. In another embodiment, the pressure range is between about 5 mm Hg and about 15 mm Hg and the heating rate is no more than about 10° C. per hour to a final temperature of not more than about 180° C., alternately to a final temperature of not more than about 150° C. In another embodiment, the pressure range is between about 10 mm Hg and about 30 mm Hg and the heating rate is no more than about 10° C. per hour to a final temperature of not more than about 170° C., alternately to a final temperature of not more than about 160° C. In another embodiment, the pressure range is between about 30 mm Hg and about 50 mm Hg and the heating rate is no more than about 10° C. per hour to a final temperature of not more than about 160° C. In another embodiment, the pressure range is between about 50 mm Hg and about 70 mm Hg and the heating rate is no more than about 10° C. per hour to a final temperature of not more than about 180° C. In one variation of any of the disclosed embodiments, the heating rate is no more than about 5° C. per hour.

Typically, the viscosity of the bio-adhesive composition remaining in the distillation pot is monitored on a regular basis. For example, the viscosity of the bio-adhesive composition can be monitored every 30 minutes, every 20 minutes, every 10 minutes or every 5 minutes. Alternately, the viscosity of the bio-adhesive composition can be measured continuously. Using methods known to those of skill in the art, viscosity can be determined by removing small samples from the distillation pot, or alternately, the distillation pot can be adapted to measure viscosity in situ, e.g. the viscosity can be measured by determining the torque necessary to stir the pot liquor.

In one aspect, the present application discloses a method of isolating a bio-adhesive composition from a bio-oil, the method comprising: (a) providing a bio-oil derived from animal waste; (b) distilling the bio-oil to remove a light liquid fraction, wherein the distilling occurs at a vacuum pressure of between about 1 mm Hg and about 80 mm Hg while heating to a temperature of up to about 60° C., optionally wherein the rate of the heating is between about 5° C. per hour and about 50° C. per hour; and (c) isolating a bio-adhesive composition from the bio-oil under conditions such that the viscosity of the bio-adhesive composition is not allowed to exceed about 1 centipoise (cP) at 135° C., optionally wherein the viscosity of the bio-adhesive composition is not allowed to exceed about 0.5 cP at 135° C. In one variation, the bio-adhesive composition comprises a heavy liquid fraction and a bio-residue. In another variation, the method further comprises using the bio-adhesive composition as a component of a composition selected from the group consisting of a bio-adhesion promoter, an asphalt bio-extender, a bio-rejuvenator, a biomodified binder, and a bio-asphalt, wherein the bio-asphalt is optionally a rubber-containing bio-asphalt or a nanoclay-containing bio-asphalt.

In another aspect, the present application discloses a method of isolating a bio-adhesive composition from a bio-oil, the method comprising: (a) providing a bio-oil derived from animal waste; (b) distilling the bio-oil to provide a distilled heavy liquid fraction and a bio-residue that is not distilled, wherein the distilling occurs under vacuum pressure, optionally of between about 1 mm Hg and about 80 mm Hg, while heating to (1) a temperature ranging from about 60° C. to about 100° C., or (2) a temperature ranging from about 100° C. to about 160° C., wherein the viscosity of the bio-residue is not allowed to exceed about 1 cP at 135° C., optionally wherein the viscosity of the bio-residue is not allowed to exceed about 0.5 cP at 135° C. and further optionally wherein the rate of the heating is between about 5° C. per hour and about 50° C. per hour; and (c) isolating the bio-adhesive composition comprising the heavy liquid fraction.

In one variation of any disclosed aspect or embodiment, the method further comprises isolating a bio-adhesive composition comprising the bio-residue. In embodiment, the animal waste comprises beef manure, dairy manure, swine manure, sheep manure, poultry manure or combinations thereof. In another variation, the temperature ranges from about 60° C. to about 100° C. and the bio-adhesive composition comprises a heavy liquid fraction comprising at least about 5% by weight of amide-containing compounds, optionally wherein the composition comprises a heavy liquid fraction comprising between about 10% and about 20% by weight of amide-containing compounds. In another variation, the temperature ranges from 100° C. to 160° C. and the bio-adhesive composition comprises a heavy liquid fraction comprising up to about 5% by weight of amide-containing compounds, optionally wherein the composition comprises a heavy liquid fraction comprising between about 1% and about 5% by weight of amide-containing compounds. In one embodiment, the method further comprises distilling the bio-oil to remove a light liquid fraction, wherein the distilling occurs at vacuum pressure between about 1 mm Hg and about 80 mm Hg while heating a temperature of up to 60° C., optionally wherein the rate of the heating is between about 5° C. per hour and about 50° C. per hour. In another embodiment, the animal waste comprises swine manure and the vacuum pressure is between about 1 mm and about 40 mm Hg, optionally wherein the vacuum pressure is between about 1 mm and about 10 mm Hg. In yet another embodiment, the bio-oil is treated with a solvent to provide a bio-char, optionally, wherein the bio-char is isolated by filtration. In one variation, the method further comprises using the bio-adhesive composition as a component of a composition selected from the group consisting of a bio-adhesion promoter, an asphalt bio-extender, and a bio-rejuvenator. In another variation, the method further comprises using the bio-adhesive composition comprising the bio-residue as a component of a composition selected from the group consisting of a bio-modified binder and a bio-asphalt, wherein the bio-asphalt is optionally a rubber-containing bio-asphalt or a nanoclay-containing bio-asphalt.

The present application discloses a bio-adhesive composition produced by any of the methods disclosed herein.

In one aspect, the present application discloses a bio-adhesive composition comprising a heavy liquid fraction and a bio-residue, wherein the composition has a viscosity of at least about 0.5 cP at 135° C., optionally between about 0.5 cP and about 1 cP at 135° C. wherein said heavy liquid fraction and bio-residue are isolated from bio-oil produced from animal waste and wherein said bio-adhesive composition does not contain a light liquid fraction.

In another aspect, the present application discloses a bio-adhesive composition comprising a heavy liquid fraction having a viscosity of between about 0.1 cP and 0.5 cP at 135° C., optionally, between about 0.2 cP and about 0.5 cP, wherein said bio-adhesive composition does not contain a light liquid fraction and wherein said heavy liquid fraction is isolated from bio-oil produced from animal waste.

In one embodiment, the present application discloses a bio-adhesive composition comprising (a) a heavy liquid fraction comprising at least about 5% by weight of amide-containing compounds, optionally containing about 10% to about 20% by weight of amide-containing compounds, or (b) a heavy liquid fraction comprising up to about 5% by weight of amide-containing compounds, optionally about 1% to about 5% by weight of amide-containing compounds, wherein said bio-adhesive composition does not contain a light liquid fraction.

In another aspect, the present application discloses a bio-adhesive composition comprising a bio-residue having a viscosity of at least about 0.4 cP, optionally between about 0.5 cP and 1 cP, at 135° C., wherein said bio-adhesive composition does not contain a light liquid fraction and wherein said bio-residue is isolated from bio-oil produced from animal waste.

In yet another aspect, the present application discloses a bio-adhesion promoter comprising a bio-adhesive composition of the present application, optionally wherein the bio-adhesive composition comprises at least about 5% by weight amide-containing compounds. The present application also discloses a method of making bio-modified asphalt composition comprising contacting components for an asphalt composition with a bio-adhesion promoter disclosed herein.

In yet another aspect, the present application discloses an asphalt bio-extender comprising a bio-adhesive composition disclosed herein, and optionally an asphalt binder. In another aspect, the present application discloses a method of making a bio-modified asphalt composition comprising contacting components for an asphalt composition with an asphalt bio-extender of the present application.

In a further aspect, the present application discloses a bio-rejuvenator for asphalt compositions comprising a bio-adhesive composition as disclosed herein and optionally an asphalt binder. In another aspect, the present application discloses a method of rejuvenating asphalt pavement, comprising contacting an asphalt composition with a bio-rejuvenator as disclosed herein.

In another aspect, the present application discloses a bio-modified binder comprising a bio-adhesive composition disclosed herein. The present application also discloses a bio-modified composition comprising a bio-adhesive composition of the present application and optionally asphalt, and further optionally wherein the asphalt is recycled asphalt. In another aspect, the present application also discloses a rubber-containing bio-asphalt composition comprising a bio-adhesive composition disclosed herein, rubber and optionally comprising an asphalt binder and/or an aggregate other than rubber. In a further aspect, the present application further discloses a nanoclay-containing bio-asphalt comprising a bio-adhesive composition as disclosed herein, nanoclay and optionally comprising an asphalt binder and/or an aggregate other than nanoclay.

The present application also discloses a method of covering a surface with a bio-modified asphalt composition, comprising contacting the surface with such a composition, optionally wherein the surface is a roof, a road, a floor, a crack or a joint. Further, the present application discloses a method of sealing a crack or joint in asphalt pavement comprising applying a bio-modified composition as disclosed herein.

In one aspect, the present application discloses a method of isolating a bio-adhesive composition from a bio-oil, the method comprising: (a) providing a bio-oil derived from animal waste; (b) distilling the bio-oil to remove a light liquid fraction, wherein the distilling occurs at a vacuum pressure of between about 1 mm Hg and about 80 mm Hg while heating at a rate of between about 5° C. per hour and about 50° C. to a temperature of up to 60° C.; and (c) isolating a bio-adhesive composition from the bio-oil under conditions such that the viscosity of the bio-adhesive composition is not allowed to exceed 1 centipoise (cP) at 135° C. In one embodiment, the animal waste comprises beef manure, dairy manure, swine manure, sheep manure, poultry manure or combinations thereof; in one variation, the animal waste comprises swine manure. In another variation, the animal waste consists essentially of swine waste. In another embodiment, the viscosity of the bio-adhesive composition is not allowed to exceed 0.5 cP at 135° C. In another embodiment, the bio-adhesive composition comprises a heavy liquid fraction and a bio-residue. In one variation of any of the disclosed aspects or embodiments, the vacuum pressure is about 3 mm Hg. In another variation, the bio-oil is treated with a solvent to provide a bio-char; in one alternative, the bio-char is isolated by filtration. In another embodiment, the method further comprises using the bio-adhesive composition as a component of a composition selected from the group consisting of a bio-adhesion promoter, an asphalt bio-extender, a bio-rejuvenator, a biomodified binder, and a bio-asphalt. In one variation, the bio-asphalt is a rubber-containing bio-asphalt or a nanoclay-containing bio-asphalt.

In another aspect, the present application discloses a method of isolating a bio-adhesive composition from a bio-oil, the method comprising: (a) providing a bio-oil derived from animal waste; (b) distilling the bio-oil to provide a distilled heavy liquid fraction and a bio-residue that is not distilled, wherein the distilling occurs under vacuum pressure while heating at a rate of between about 5° C. per hour and about 50° C. per hour to (1) a temperature ranging from 60° C. to 100° C., or (2) a temperature ranging from 100° C. to 160° C., wherein the viscosity of the bio-residue is not allowed to exceed 1 cP at 135° C.; and (c) isolating the bio-adhesive composition comprising the heavy liquid fraction. In one embodiment, the method further comprises isolating a bio-adhesive composition comprising the bio-residue. In one variation of any disclosed aspect or embodiment, the animal waste comprises beef manure, dairy manure, swine manure, sheep manure, poultry manure or combinations thereof In one alternative, the animal waste comprises swine manure; in another variation, the animal waste consists essentially of swine waste. In another variation, the viscosity of the bio-residue is not allowed to exceed 0.5 cP at 135° C. In one embodiment of the methods disclosed herein, the temperature ranges from 60° C. to 100° C. and the bio-adhesive composition comprises a heavy liquid fraction comprising about 10% to about 20% by weight of amide-containing compounds. In another embodiment of the disclosed methods, the temperature ranges from 100° C. to 160° C. and the bio-adhesive composition comprises a heavy liquid fraction comprising about 1% to about 5% by weight of amide-containing compounds. In one variation, the methods disclosed herein further comprise distilling the bio-oil to remove a light liquid fraction, wherein the distilling occurs at vacuum pressure between about 1 mm Hg and about 80 mm Hg while heating at a rate of between about 5° C. per hour and about 50° C. to a temperature of up to 60° C. In yet another variation, the vacuum pressure is about 3 mm Hg. In one embodiment, the bio-oil is treated with a solvent to provide a bio-char; in one variation, the bio-char is isolated by filtration. In one embodiment, the method further comprises using the bio-adhesive composition as a component of a composition selected from the group consisting of a bio-adhesion promoter, an asphalt bio-extender, and a bio-rejuvenator. In another embodiment, the method further comprises using the bio-adhesive composition comprising the bio-residue as a component of a composition selected from the group consisting of a bio-modified binder and a bio-asphalt. In one variation, the bio-asphalt is a rubber-containing bio-asphalt or a nanoclay-containing bio-asphalt.

In one aspect, the present application discloses a bio-adhesive composition produced by any of the methods disclosed herein. In another aspect, the present application discloses a bio-adhesive composition, comprising a heavy liquid fraction and a bio-residue, wherein the composition has a viscosity of about 0.5 cP at 135° C. wherein said heavy liquid fraction and bio-residue is isolated from bio-oil produced from animal waste and wherein said bio-adhesive composition does not contain a light liquid fraction. In yet another aspect, the present application discloses a bio-adhesive composition, comprising a heavy liquid fraction having a viscosity of between about 0.1 cP and 0.5 cP at 135° C., optionally, between about 0.2 cP and about 0.5 cP, wherein said bio-adhesive composition does not contain a light liquid fraction. In one variation of any of the disclosed aspects or embodiments, the bio-adhesive composition comprises a heavy liquid fraction comprising about 10% to about 20% by weight of amide-containing compounds, wherein said bio-adhesive composition does not contain a light liquid fraction. In another variation, the bio-adhesive composition comprises a heavy liquid fraction comprising about 1% to about 5% by weight of amide-containing compounds, wherein said bio-adhesive composition does not contain a light liquid fraction.

In another aspect, the present application discloses a bio-adhesive composition, comprising a bio-residue having a viscosity of at least about 0.4 cP, optionally between about 0.5 cP and 1 cP, at 135° C., wherein said bio-adhesive composition does not contain a light liquid fraction.

In yet another aspect, the present application discloses a bio-adhesion promoter comprising any bio-adhesive composition disclosed herein. In one embodiment, the bio-adhesive composition comprises at least about 5% by weight amide containing compounds. In one embodiment, the present application discloses a method of making bio-modified asphalt composition, comprising contacting components for an asphalt composition with a bio-adhesion promoter disclosed herein.

In another aspect, the present application discloses an asphalt bio-extender comprising a bio-adhesive composition disclosed herein and optionally an asphalt binder. In one embodiment, the present application discloses a method of making a bio-modified asphalt composition, comprising contacting components for an asphalt composition with an asphalt bio-extender disclosed herein.

In yet another aspect, the present application discloses a bio-rejuvenator for asphalt compositions, the bio-rejuvenator comprising a bio-adhesive composition as disclosed herein, and optionally an asphalt binder. In one embodiment, the application discloses a method of rejuvenating asphalt pavement, comprising contacting an asphalt composition with a bio-rejuvenator disclosed herein.

In another aspect, the present application discloses a bio-modified binder comprising a bio-adhesive composition disclosed herein and optionally asphalt. In one variation of any of the disclosed aspects or embodiments, the asphalt in the bio-modified composition is recycled asphalt. In another aspect, the present application discloses a rubber-containing bio-asphalt composition comprising a bio-adhesive composition disclosed herein, rubber and optionally an asphalt binder. In yet another aspect, the present application discloses a nanoclay-containing bio-asphalt comprising a bio-adhesive composition disclosed herein, nanoclay and optionally an asphalt binder. In one variation of any of the disclosed aspects or embodiments, the bio-modified asphalt composition further comprises an aggregate other than rubber or nanoclay. In one aspect the present application discloses a method of covering a surface with a bio-modified asphalt composition, comprising contacting the surface with a composition disclosed herein. In one variation, the surface is a roof, a road, a floor, a crack or a joint. In another aspect, the present application discloses a method of sealing a crack or joint in asphalt pavement comprising applying a bio-modified composition as disclosed herein.

Depending on the properties of the components targeted and isolated according to the methods of the present application as disclosed herein, a range of industrially useful products can be prepared including, but not limited to, a fertilizer nutrient, bio-soil amendment, bio-fuels, a bio-adhesion promoter, an asphalt bio-extender, an asphalt bio-binder and a bio-asphalt.

EXAMPLES

Materials and Methods
Preparation of Bio-Oil

Bio-oil can be obtained from animal waste according to methods known to those of skill in the art, including thermochemical liquefaction ("TCC"), a chemical reforming process using heat and pressure in the absence of oxygen to break down long-chain organic compounds into short chain molecules yielding a bio-oil. For example, swine manure can be converted to bio-oil via TCC under known conditions, for example at 305° C. at 10.3 MPa at a residual time of 80 minutes (Ocfemia, K., 2005 "Hydrothermal Process of Swine Manure to Oil Using a Continuous Reactor System" Dissertation, University of Illinois at Urbana-Champaign, AAT 3202149).

Beef, dairy, or poultry manure can be converted to bio-oil via thermochemical liquefaction under known conditions, for example at 350° C., with 15 minute retention time, using CO as process gas, at a pressure of 2.06 MPa, with the addition of 1 g sodium carbonate. (Midgett, J. S. 2008 "Assessing A Hydrothermal Liquefaction Process Using Biomass Feedstocks" Thesis, Louisiana State University).

In the following examples, thermochemical liquefaction of animal waste to form bio-oil was conducted using a high-pressure batch reactor (autoclave). The experimental set-up is rated up to a working pressure of 34.4 MPa and a working temperature of 500° C. A heavy-duty magnetic drive stirrer was used for mixing. A type-J thermocouple was fitted into the reactor for direct temperature measurements of the reaction media. A standard pressure gauge was used on the reactor head. A temperature controller was used to control the temperature of the reactor.

Example 1a

Preparation of Bio-Oil from Chicken Manure

Chicken manure slurry retrieved from NC A&T's farm (Greensboro, North Carolina, United States of America) was employed. About 1 gallon of chicken manure slurry, which is typically about 60-80% liquid by weight, was charged in a 1.5 gallon reactor. Nitrogen gas was used to purge the reactor three times.

The purged reactor was then heated over the course of ~2.5 hours to a setting temperature of 340° C., and the pressure of the autoclave raised to a reaction pressure of about 10.3 MPa. The setting temperature can alternately be set to between about 280° C. and about 360° C. When run at 340° C. at 10.3 MPa, the reaction was completed in about 15-20 minutes. The reactor was cooled to room temperature using a recycled ice-water cooling coil over the course of at least about 2 hours. After cooling, the by-product gas was released from the autoclave, and the pressure in the autoclave reduced to atmospheric pressure.

The reaction mixture, including bio-oil, solid and aqueous phases, can be removed from the autoclave for subsequent processing and separation as in Example 2.

Example 1b

Preparation of Bio-Oil from Swine Manure

Swine manure slurry retrieved from lagoons or deep pits on NC A&T's farm was employed in the following procedure.

About 1 gallon of swine manure slurry, which is typically about 80%-95% liquid by weight, was charged in a 1.5 gallon reactor. Nitrogen gas was used to purge the reactor three times as an optional step; alternately, the thermochemical liquefaction can be run in a semi-closed system, wherein the gaseous reaction products pressurize the reaction container, thereby decreasing the concentration of oxygen to negligible levels. The purged reactor was then heated over the course of ~2.5 hours to a setting temperature of 340° C., and the pressure of the autoclave raised to a reaction pressure of 10.3 MPa. The setting temperature can alternately be set to between about 280° C. and about 360° C. When run at 340° C. at 10.3 MPa, the reaction was completed in about 15 minutes. The reactor was cooled to room temperature using a recycled ice-water cooling coil over the course of at least about 2 hours. After cooling, the by-product gas was released from the autoclave, and the pressure in the autoclave reduced to atmospheric pressure.

The reaction mixture, including bio-oil, solid and aqueous phases, was removed from the vessel for separation as in Example 2.

Example 2

Isolation of Components from Bio-Oil Produced from Swine Manure

Generally, the components of the bio-oil were isolated via a step-wise process: The aqueous phase was isolated via filtration as 'black water.' The solid by-product was isolated by adding solvent (acetone or acetone/toluene mixture) to the sticky residue thereby dissolving the bio-oil and leaving behind insoluble bio-char, comprising roughly 10% of the bio-oil. The bio-oil+solvent was then vacuum distilled at 3 mm Hg with heating at a rate of between 15° C. per hour and 30° C. per hour up to final distillation temperature of about 160° C. The various fractions, including solvent, light liquid fraction and the remaining mixture of a heavy liquid fraction and bio-residue were isolated as described.

Example 2a

Isolation of Black Water from Bio-Oil

The reaction mixture, including bio-oil, solid and aqueous phases, from Example 1b was vacuum filtered. The filtrate, referred to as black water, was isolated and can be used as a soil fertilizer, as it is rich in agricultural nutrients and does not contain measureable amounts of pathogens.

Example 2b

Isolation of Bio-Char from Bio-Oil

The sticky residue from the vacuum filtration of Example 2a was rinsed with 10-50% solvent (either acetone or a 30:70 acetone/toluene mixture) and filtered.

The solid by-product isolated from the filtration, referred to as "bio-char" generally comprises about 10% of intermediate bio-oil by weight and can be used in soil amendment.

Example 2c

Isolation of Light Liquid Component from Bio-Oil

The filtrate from Example 2b was placed in a vacuum distillation apparatus and the pressure in the apparatus was lowered to 3 mm Hg.

The gaseous fractions of the bio-oil, the solvent (acetone or acetone/toluene mix) and the Light Liquid Fraction were collected via vacuum distillation at 3 mm Hg up to a distillation temperature of 60° C., using a heating rate of 15° C.-30° C. per hour.

To obtain gasoline and other liquid fuels, the quality of the light liquid component from the bio-oil of the present application can been improved by using processes such as fractional distillation, thermal cracking, hydrogenation and/or other methods familiar to those of skill in the art.

Example 2d

Isolation of Bio-Residue and Heavy Liquid Fraction ("Bio-Residue+HLF")

After removal of the gaseous components, the solvent and the light liquid fraction, the remaining pot liquor from Example 2c comprised a heavy liquid fraction and bio-residue. The viscosity of the remaining mixture was measured every 10 minutes during distillation of the Light Liquid Fraction and the viscosity was not allowed to go above 0.5 cP at 135° C. before the mixture was removed from the apparatus and isolated.

Example A

Preparation of a Bio-Adhesion Promoter

Figure 3:
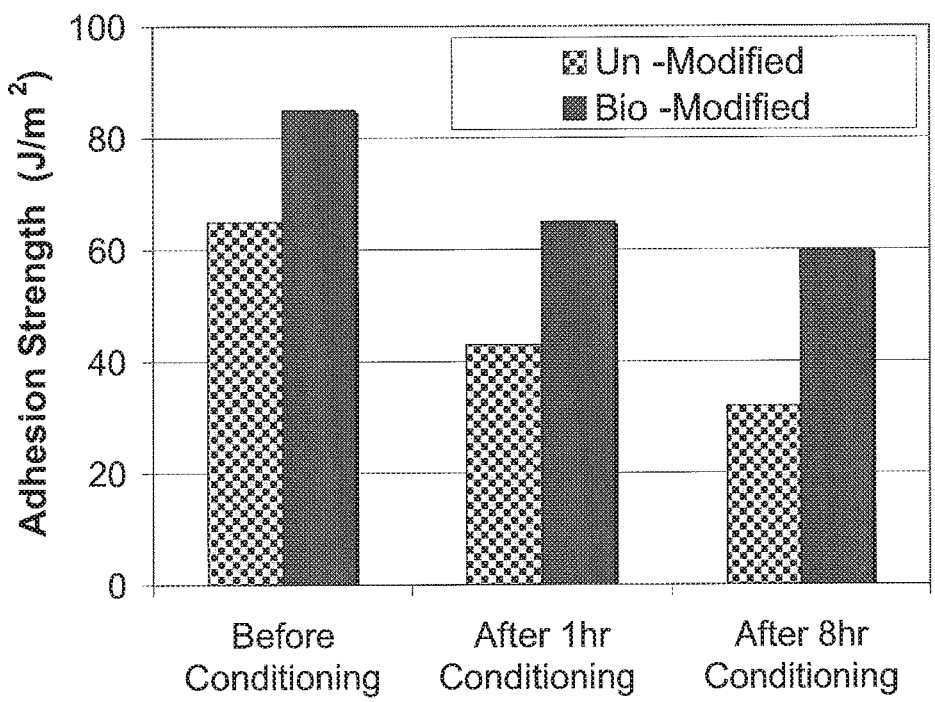
FIG. 3 is a bar graph comparing adhesion strength between asphalt binder and bio-modified binders comprising 5% by weight bio-binder.

It has been shown that the bio-adhesive sample from Example 2d has properties of a bio-adhesion promoter. In particular, the Example 2d sample was combined with petroleum-based asphalt binder at a proportion of 5%:95% (bio-product: petroleum product) and the resulting bio-modified binder mixture was then combined with quartz substrate and subjected to a direct adhesion test (conditioning in water at 25° C. for 1 hr. or 8 hr.). The results in FIG. 3 demonstrate the higher adhesion strength for the bio-modified sample.

Without being bound by theory, it is believed that the bio-adhesives of the present application, such as for example, the heavy liquid fraction with amide-containing compounds, have polar ends and a non-polar hydrocarbon tails. When the bio-adhesive is added to a petroleum-based asphalt binder, the polar ends of the compounds in the bio-adhesive attach to the aggregates, such as quartz substrate (polar surfaces) and the non-polar tails attach to asphalt (non-polar), thereby promoting adhesion between asphalt and quartz substrate.

Example B

Preparation of an Asphalt Bio-Extender

It has been shown that the bio-adhesive sample from Example 2d has properties of an asphalt bio-extender. In particular, the bio-adhesive sample from Example 2d, having a viscosity of 0.5 cP at 135° C. was added to asphalt base binder PG 64-22 at 2%, 5%, and 10% by weight of the base binder to produce bio-modified binder. Bio-binder and base binder were heated to 60° C. and 120° C., respectively. The base binder and bio-binder were mixed thoroughly at shear rate of 3000 rpm for 30 minutes, while the temperature was kept at 120° C.

The asphalt and bio-modified asphalt samples were evaluated using a bending beam rheometer (BBR), which measures stiffness and creep rate at temperatures representative of the lowest pavement temperature. In the experiment, a constant load is applied at the center of an asphalt sample for four minutes—the load simulates the stresses that build up in pavement upon a drop in temperature. The m-value, as determined by BBR is a measure of how the asphalt stiffness changes as loads are applied and is the slope of log stiffness versus log time curve at any time, t.

Figure 4:
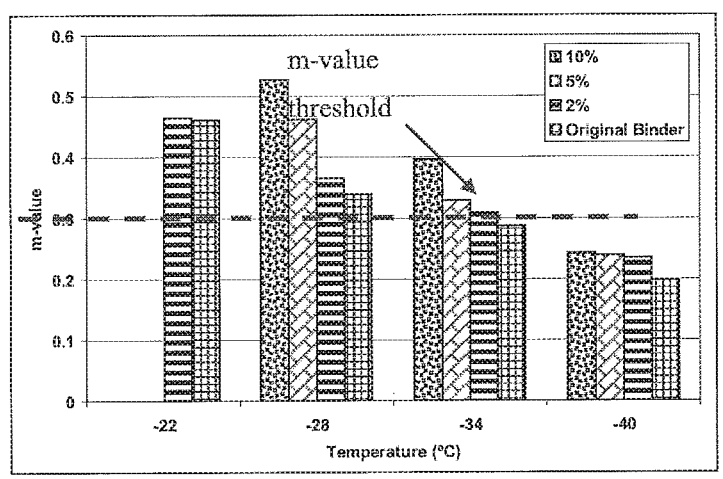
FIG. 4 is a bar graph comparing the m-value, as determined via Bending Beam Rheometer, of petroleum-based asphalt compared to bio-modified binder, comprising 2%, 5% or 10% bio-binder by weight.

As shown in FIG. 4, the m-value of virgin asphalt increases due to the addition of bio-binder, improving binders' stress relaxation capability, which results in less stress accumulation. At 5% and 10% modification with bio-adhesive, the specimens were too soft to be tested and their deflections were above the equipment range. Without being bound by theory, it is expected that the improvement in low temperature properties of the binder results in reduced low temperature cracking due to the general reduction in binder stiffness and increase in m-value. In this way, the addition of a robust soft bio-binder exemplifies the properties of a bio-extender. When the refining process for asphalt removes too much 'soft' material, the bio-binder acts as an effective bio-extender, softening the bio-modified asphalt.

Example C1

Preparation of Bio-Modified Asphalt Binder

The bio-adhesive sample from Example 2d having a viscosity of 0.5 cP at 135° C. was combined with PG52-28 asphalt binder at a loading of 5% bioadhesive by weight asphalt binder to create BMB-PG52-28-5. The base binder and bio-binder were mixed thoroughly at shear rate of 3000 rpm for 30 minutes at 124° C. The resulting bio-modified binder was compacted at 113° C. according to standard methods, e.g. AASHTO T 312 (Gyratory compaction of HMA Mixtures).

To evaluate the effect of the addition of the 5% bio-binder to the virgin binder, the bio-modified and virgin binders were tested to determine their rheological properties and performance grade in accordance with AASHTO R29.

Viscosity testing results indicated that the bio-modified binder had a reduced viscosity, as compared to the virgin binder. Lower binder viscosity can lead to a more workable mixture and this agrees with the mixture workability results which indicated increased workability for mixtures with the bio-modified binder. Without being bound by theory it is believed that mixtures produced with the bio-modified binder release thermal stresses faster than petroleum-based asphalt binder thereby improving the thermal characteristics of mixtures designed with the bio-modified binder.

Example C2

Preparation of Bio-Asphalt Mixture Comprising BMB and RAP

The effect of bio-modified asphalt binder prepared in Example C1 was evaluated in combination with 40% recycled asphalt pavement ('RAP') and 60% aggregate comprising 9.5 mm crushed stone, natural sand, stone sand and stone dust and developed to meet the requirements for a 9.5 mm Superpave mixture in accordance with AASHTO M323 "Superpave Volumetric Mix Design" and AASHTO R35 "Superpave Volumetric Design for Hot Mix Asphalt."

The properties of the bio-modified-RAP asphalt were compared to (1) a control sample comprising PG52-28 asphalt binder mixed with 9.5 mm Superpave Mixture; (2) a sample comprising control of (1)+40% RAP mixture; and (3) a sample comprising control of (1)+5% bio-modified asphalt binder prepared in Example C1.

It is well known that improvements observed in asphalt binder studies are not consistently reflected in asphalt mixtures, because the added materials and increased number of variables lead to variations in properties of asphalt mixtures. As shown herein, the addition of the bio-modified asphalt binder improved low temperature cracking properties. It also improved the moisture resistance compared to the control asphalt mixture that did not contain the bio-binder.

Figure 5A:
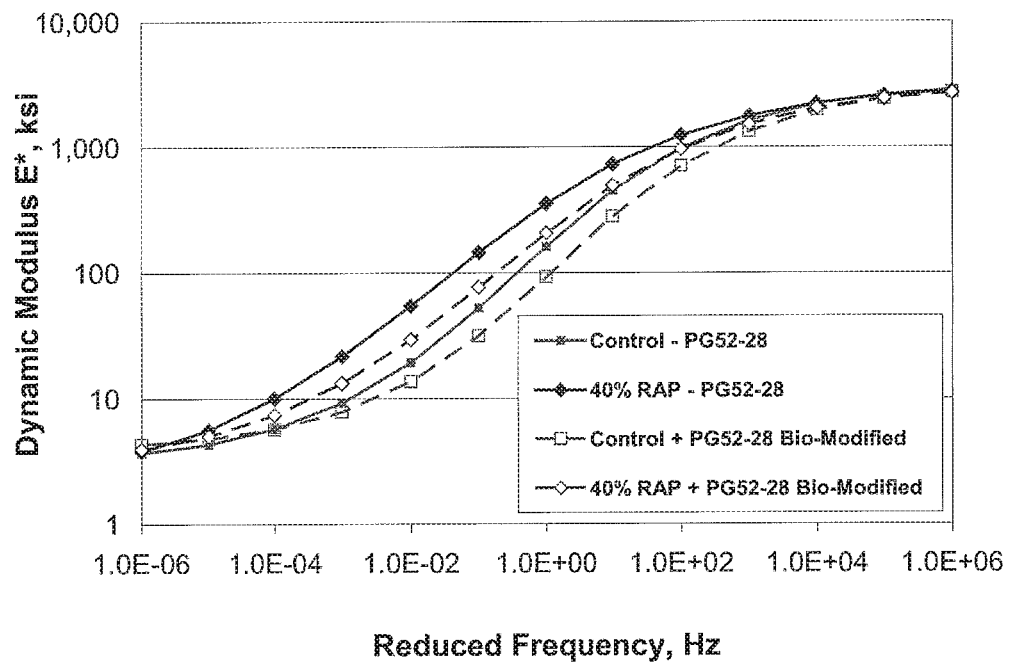
FIG. 5A is a graph of reduced frequency vs. dynamic modulus of RAP-containing asphalt mixtures compared to samples including a bio-adhesive of the present application.

The addition of bio-modified binder reduces the stiffening effects caused by the introduction of high percentages of reclaimed asphalt pavement (RAP) in the mixture. FIG. 5A shows a master curve, characterizing the stiffness of the mixtures over a wide range of frequencies and temperatures, and demonstrates that the incorporation of 40% RAP to the control mixture increased its stiffness. Typically, negative effects are observed when the stiffness of the mixture gets too high—the mixture can become too brittle, which may result in thermal cracking. The introduction of the bio-modified binder decreased the mixture stiffness for both the control and 40% RAP mixtures as compared to the mixtures fabricated with PG52-28 binder. This indicated that the bio-modified binder reduced the stiffening effects caused by the introduction of high percentages of RAP in the mixture. The data for the control mixture fabricated with the bio-modified binder corresponded well with the volumetric data, which showed a reduction in air voids at the design gyration level, indicating the mixture is less stiff and easier to compact.

Figure 5B:
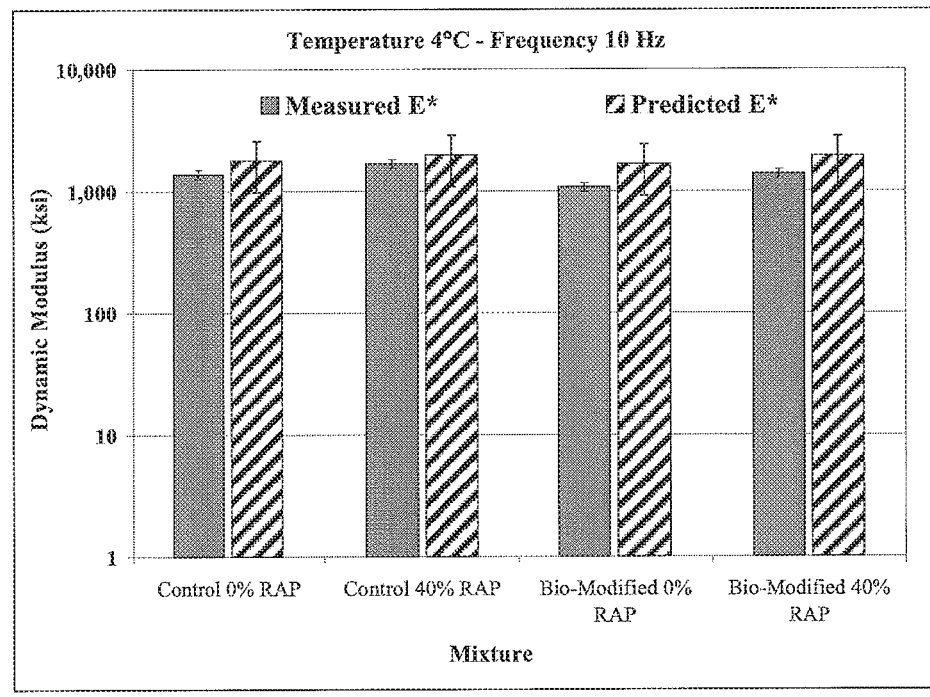
FIG. 5B is a bar graph of dynamic modulus for each mixture type at 4° C. at a frequency of 10 Hz.
Figure 5C:
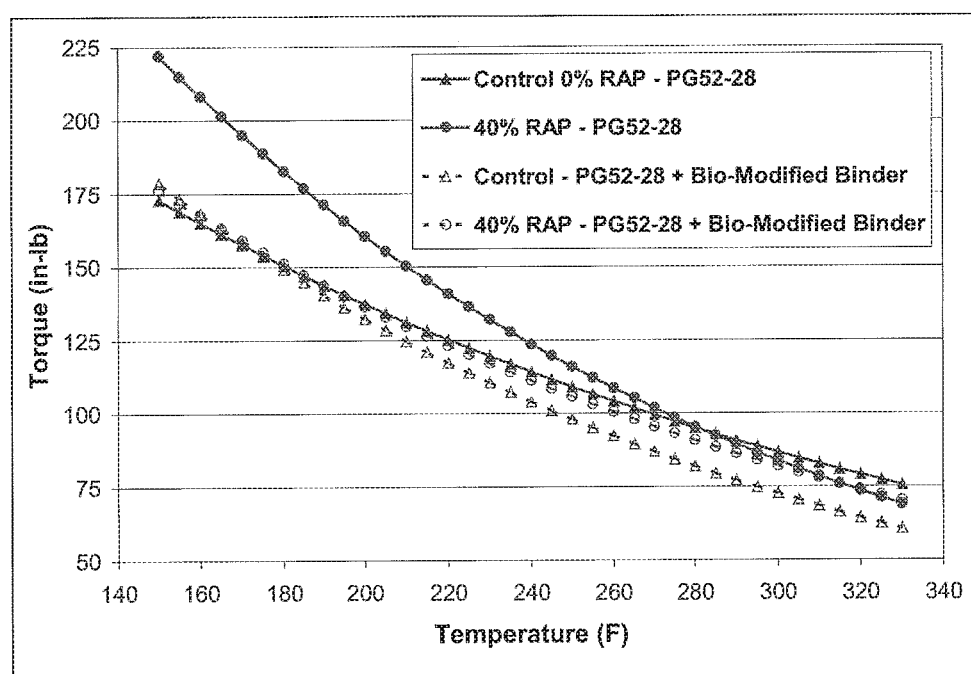
FIG. 5C is a graph of mixture workability test results of RAP-containing asphalt mixtures compared to samples including a bio-adhesive of the present application.

As shown in FIG. 5C, the incorporation of 40% RAP reduced the workability of the control mixture. This is consistent with the data in FIG. 5A because the 40% RAP mixture had higher stiffness as was illustrated in the dynamic modulus master curves of the mixtures. The addition of the bio-modified binder improved the workability of the 40% RAP mixture. At temperatures below 280° F. (138° C.) the workability of the control mixture and the 40% RAP with bio-modified binders were identical, as illustrated in FIG.

5C. The control mixture with the bio-modified binder exhibited the lowest torque, consequently, best workability. As demonstrated herein, the viscosity of the bio-modified binder was significantly lower than that of the base non-modified binder; without being bound by theory the reduction in viscosity may be a contributing factor to the improved workability.

Example D

Preparation of an Asphalt Bio-Rejuvenator

The data in Example C further demonstrate that the bio-adhesive sample from Example 2d has properties of an asphalt bio-rejuvenator.

FIG. 5A, the master curve of dynamic modulus, shows that the bio-modified binder rejuvenated the 40% RAP mixture to the extent that its properties were very close to the mixture with no RAP. In other words, bio-modified binder cancelled out the negative effect of oxidized RAP on the dynamic modulus of the mixture. As shown in FIG. 5B, the predicted and measured dynamic modulus, |E*|, the addition of the bio-modified binder to the composition comprising 40% RAP shifts the dynamic modulus of the composition back to that of the control composition, comprising 0% RAP.

Without being bound by theory it is believed that the bio-adhesive sample replaces the 'soft, light' compounds that are lost as asphalt ages, or oxidizes.

Example E

Preparation of Rubber Containing Bio-Asphalt

The bio-adhesive sample from Example 2d having a viscosity of 0.5 cP at 135° C. was used in the preparation of rubber-containing bio-asphalt as disclosed herein.

Crumb Rubber Gradation

The crumb rubber used for this experiment was obtained from reRubber LLC of Ontario, Canada. It was processed by ambient means, giving the sample more size and shape consistency. The mesh size of the crumb rubber was selected to be 80-200 as typically smaller particle size requires less reaction time.

Bio Modified Rubber (BMR)

The binder was blended by means of the wet process using crumb rubber particle sizes passing the No. 50 sieve. Wet process blending was used to mix 80-200 mesh crumb rubber and petroleum based binder (PG 64-22) at three percentages of crumb rubber (5%, 10%, and 15%) with one equivalent of the bio-adhesive of Example 2d (5%) by the weight of the petroleum based binder. The blending was accomplished by means of a laterally attached oscillating drill. Shearing was conducted at the speed of 1000 rpm for 30 minutes at 200° C.

To study the temperature susceptibility of each binder, the VTS values were calculated based on Equation 1:

$$VTS = \frac{[\log(\eta T_2) - \log[\log(\log(\eta T_1)]}{\log(T_2) - \log(T_1)} \quad (1)$$

Figure 6A:
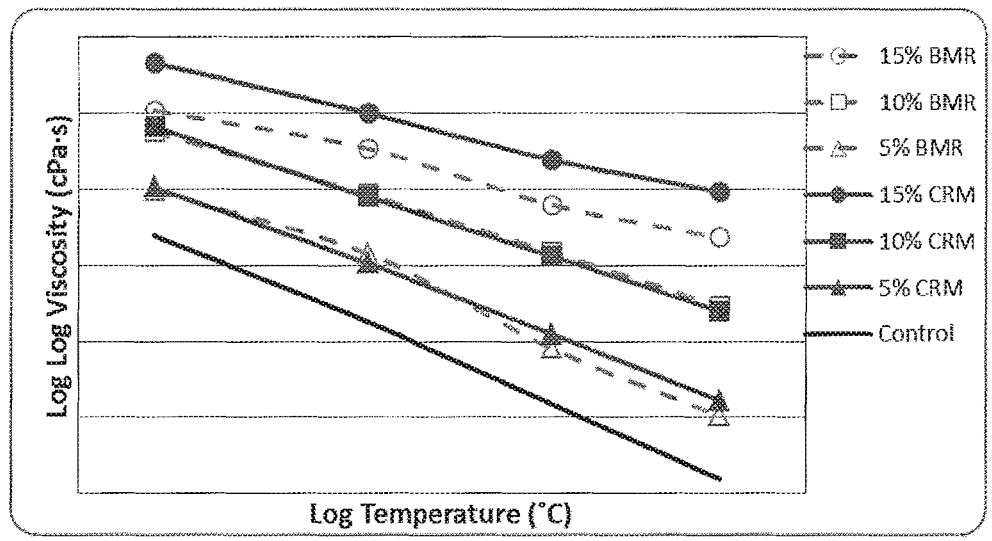
FIG. 6A is a graph of the change in viscosity vs. change in temperature in rubber-containing asphalts comprising asphalt binder or bio-modified binder.

T1 and T2 are the temperatures of the binder at known points, $\eta T1$ and $\eta T2$ are the respected viscosities (cP) of the binder at those known points. Typically, the magnitude of the VTS is directly proportional to the temperature susceptibility of the binder. The results have been plotted for CRM, BMR, and the control binder in FIG. 6A. As is shown, both BMR and CRM samples have lower slopes than that of the control binder indicating that the temperature susceptibility of binder was reduced due the modification with rubber and bio-binder.

Figure 6B:
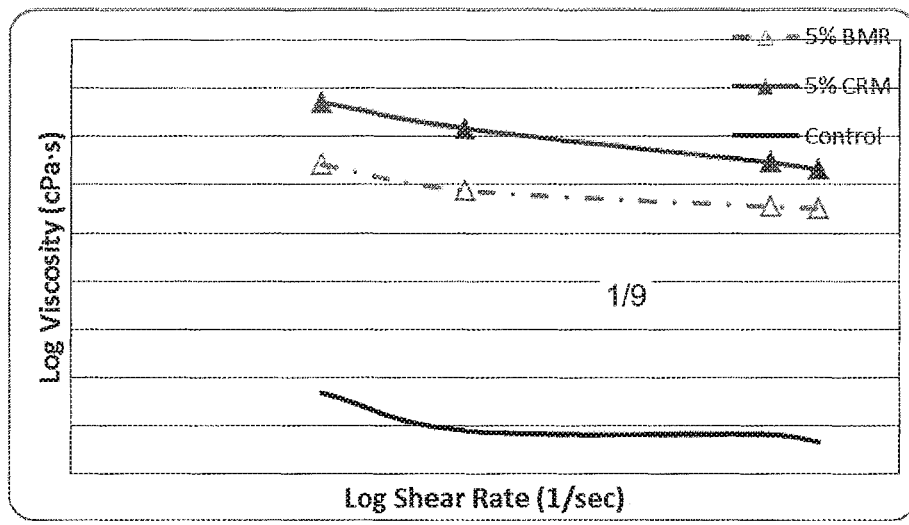
FIG. 6B is a graph of the change in viscosity vs. change in temperature in rubber-containing asphalts comprising asphalt binder or bio-modified binder.

To investigate effects of rubber modification on shear susceptibility, the 'shear susceptibility' ('SS'), defined as the rate of change of viscosity with the rate of shear, was determined at different temperatures and plotted for both CMR and BMR in comparison with the control binder (FIG. 6B). It can be seen that SS values for both BMR and CRM are higher than those of control asphalt; this is expected due to the presence of rubber particles. Typically, when rubber is blended with asphalt, the rubber particles are swollen by absorption of the asphalt's oily phase into the polymer chains of crumb rubber to form a gel-like material. Unlike polymers, which disperse completely in the asphalt and cause changes in the molecular structure of the asphalt, crumb rubber keeps its physical shape and behaves as flexible particulate filler in the binder producing a non-homogeneous nature. This in turn, gives rise to shear susceptibility due to the movement of rubber particles relative to each other in the binder matrix.

As shown, CRM has higher shear susceptibility than control asphalt; the addition of bio-binder to a composition comprising crumb rubber led to a reduction in shear susceptibility. Without being bound by theory, the reduction in shear susceptibility can be attributed to high oily phase of bio-binder which can be easily absorbed by rubber particles to enhance swelling. This in turn will produce a gel-like matrix, which is more homogenous and less susceptible to shear compared to a non-homogeneous matrix of flexible rubber particles that can easily shear against each other.

Example F

Preparation of Nanoclay-Containing Bio-Asphalt

Materials

The test materials used in this study are virgin asphalt binder PG 58-28 from Gladstone, Mich., United States of America, nano-modified asphalt binder containing 2% and 4% nano silica and 2% and 4% Closite 30B (all by weight of base asphalt) from Southern Clay Products, Inc. and the bio-adhesive analogous to Example 2d (5% by weight of base asphalt), prepared according to Example 2, except that the thermochemical liquefaction process was run at 360° C. for 15 min at 10.5 MPa. The bio-adhesive was isolated as described in Example 2.

Fabrication of Asphalt Nano Composite

The nano-modified asphalt materials were prepared using a high shear mixer. The bitumen was first heated at about 135° C. until it became fluid in the mixer. Then 2% and 4% nanoclay (by weight of base binder) was added to the asphalt, and the mixture was blended at 5,000 rpm for 2 h. The nano-silica asphalt composite was processed under the same conditions.

Fabrication of Bio-Modified Binder Nanocomposites

The bio-adhesive described above was added to the base asphalt binder (PG58-28) at a rate of 5% by weight of asphalt binder to create the bio-modified binder. The blending of base binder and bio-adhesive was accomplished by means of a shear mixer. Shearing was conducted at the speed of 1,600 rpm for 30 minutes at 120° C.

The bio-modified binder nanocomposite was prepared by adding 5% of bio-binder by weight of asphalt binder to base binder (PG58-28), and blending at 3,000 rpm for 10 min while temperature was kept at 120° C. After 10 min, 2% and 4% by weight of nanoclay and nanosilica was added to the mixture blending at 5,000 rpm for 20 min with the temperature kept at 120° C.

Rolling Thin Film Oven Short Term Aging Procedure

A Pressure Aging Vessel, conforming to ASTM 6521-08, was used to perform long term-aging, Rolling Thin Film Oven aging, in accordance with ASTM D 2872-04.

Figure 7A:
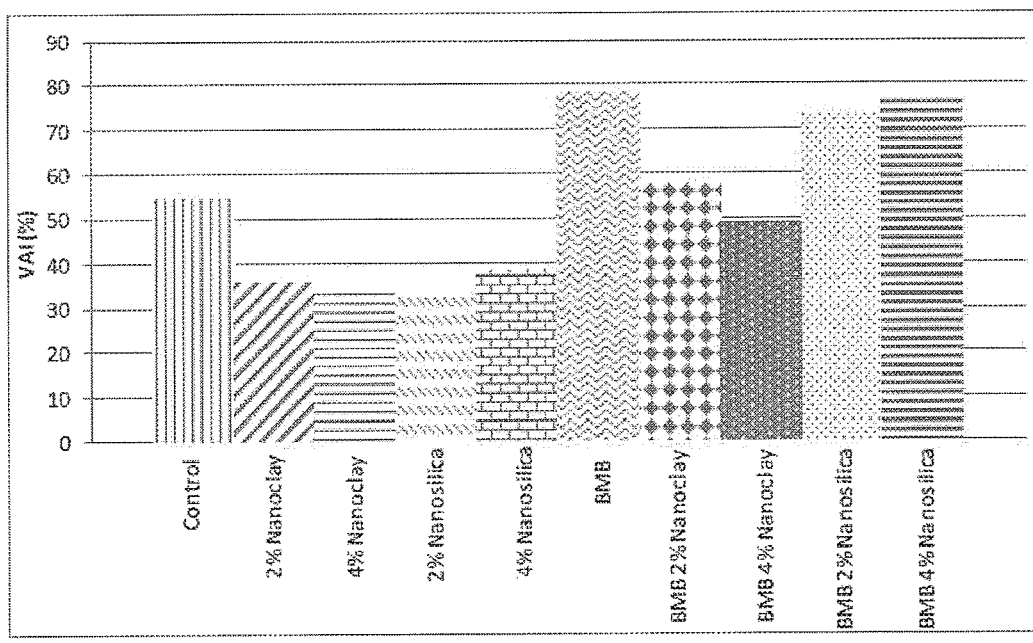
FIG. 7A is a bar graph showing the effect on aging index when nanoparticle-containing asphalts are combined with bio-modified binder.

The addition of bio-binder enhanced the high temperature performance and improved the aging resistance of nanoparticle containing asphalt. As shown in FIG. 7A, the aging resistance of each of the 2% and 4% nanoparticle-containing asphalt decreased compared to the control binder, based on the calculated viscosity aging index (VAI), which is calculated by measuring the viscosity of the sample before and after short term rolling thin film oven:

$$VAI = \frac{RTFO \text{ aged viscosity value} - \text{Unaged viscosity value}}{\text{Unaged Viscosity value}}$$

While there was no significant difference between the effectiveness of nanoclay and nanosilica on the aging of control asphalt, the addition of bio-binder affected the nanoparticle-containing asphalts differently. Without being bound by theory, this property is attributed to higher affinity of bio-binder for silicate layers in nanoclay giving rise to a degree of exfoliation.

Figures 1, 7B:
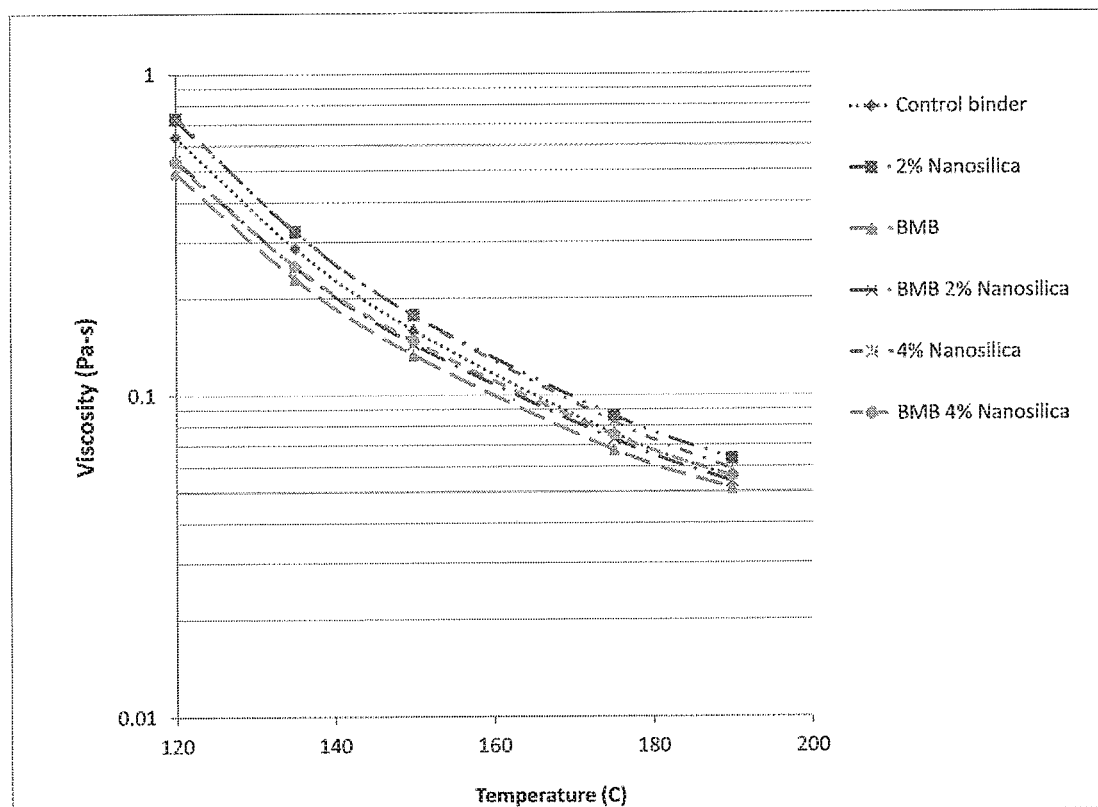
FIG. 7B-1 is a graph showing effect on viscosity when nanoparticle-containing asphalts are combined with bio-modified binder.
Figures 2, 7B:
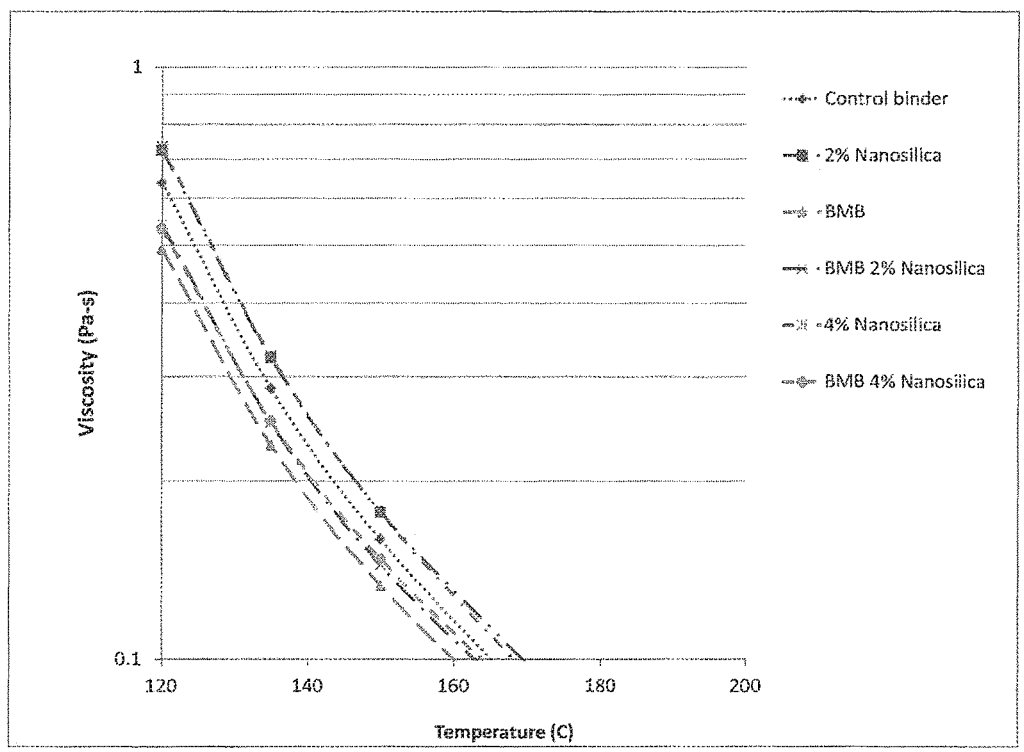

Addition of bio-binder to these asphalts improved the aging resistance and for the nanoclay-containing asphalts, the viscosity aging index is on par to the control asphalt. As shown in FIG. 7B, the addition of 2% nanoclay increased viscosity of the control binder by 22% on average and the addition of 4% nanoclay increased it by an average of 36% within the temperature range (120° C. to 190° C.). The addition of bio-binder to the control asphalt binder decreased the viscosity by an average of 16%. The addition of bio-binder to the 2% and the 4% nanoclay samples increased viscosity by an average of 13% and 57%, respectively.

Example 3

Isolation of Components from Bio-Oil Produced from Animal Waste

In one variation, an apparatus 200 as disclosed in FIG. 2 can be used for post-processing bio-oil prepared from animal waste comprising beef, dairy, poultry, sheep, or swine manure or combinations thereof. In a first processing step, product mixture 204 of bio-char+bio-oil+solvent is added to filtration device 202, which captures the insoluble bio-char. The bio-oil in solution is transferred in the direction of arrow A to vacuum distillation apparatus 206, which is heated by the designated heater 222, at temperatures in accordance with the methods disclosed herein. Pressures are monitored with vacuum gauge 208. Solvent 210 is first driven off, followed by the light liquid fraction 212. The heavy liquid fraction 214 can be (1) separately collected as an amide-compound containing fraction and a fraction with a low concentration of amide-containing products or (2) left in the pot liquor and collected in combination with the remaining bio-residue. Each volatile fraction can be condensed in condenser 215 and isolated from collection tank 224 via condensate drain 234. The viscosity of the remaining residue is determined based on the level of torque required to stir the residue, as shown in FIG. 2. The residue product P flows at higher temperatures, for example at the terminal distillation temperatures disclosed herein and the bio-residue product P can be collected by pumping the 'liquid' over an optional dessicator 216 to remove odorous volatile compounds.

Example 3a

Isolation of Black Water

The reaction mixture, including bio-oil, solid and aqueous phases, from Example 1b was vacuum filtered, isolating the aqueous phase, referred to as black water, which contains insignificant quantities of pathogens and can be used as a fertilizer.

Example 3b

Isolation of Bio-Char

The sticky residue from the vacuum filtration of Example 3a was rinsed with 10-50% solvent (either acetone or a 30:70 acetone/toluene mixture) and filtered, separating the insoluble bio-char from the bio-oil in solution in the filtrate.

Example 3c

Isolation of Light Liquid Fraction from Bio-Oil

The filtrate from Example 3b was placed in a vacuum distillation apparatus and the pressure in the apparatus was lowered to 3 mm Hg.

The gaseous fractions of the bio-oil, the solvent (acetone or acetone/toluene mix) and the Light Liquid Fraction were collected via vacuum distillation at 3 mm Hg using a heating rate of 15° C. to 30° C. per hour up to a distillation temperature of 60° C.

Example 3d

Isolation of Heavy Liquid Component Containing High Concentration of Amide Groups from Bio-Oil The pot liquor from Example 3c was further vacuum distilled at 3 mm Hg using a heating rate of 15° C. to 30° C. per hour from 60° C. to 100° C. for collection of the Heavy Liquid Fraction containing amide compounds.

When the collection of the first heavy liquid fraction was completed, the condensed sample had a viscosity of about 0.1 cP. The sample also contained 10-20% amide compounds., as determined by FT-IR.

This Heavy Liquid Fraction containing amide compounds can be useful as a bio-adhesion promoter and optionally as a bio-extender or bio-rejuvenator.

Example 3e

Isolation of Heavy Liquid Component Containing Low Concentration of Amide Groups from Bio-Oil The pot liquor from Example 2c was further vacuum distilled at 3 mm Hg using a heating rate of 15° C. to 30° C. per hour from 100° C. to 160° C. for collection of the Heavy Liquid Fraction containing a low concentration of amide compounds.

When the collection of the second heavy liquid component was completed, the condensed sample had a viscosity of about 0.1 cP. The sample contained amide-containing compounds, but at a lower concentration compared to the fraction of Example 3d.

This Heavy Liquid Fraction containing low amounts of amide compounds can be useful as a bio-extender or bio-rejuvenator.

Example 3f

Isolation of Bio-Residue

As disclosed herein, the quality of the bio-residue from the vacuum distillation of the volatile components of the bio-oil is dependent on a number of factors, including accurate control of distillation parameters as well as monitoring the viscosity of the residue.

During isolation of the components in Examples 3c to 3e, the viscosity of the remaining residue was monitored every 10 minutes and was not allowed to rise above about 0.5 cP at 135° C. After isolation of the other components disclosed, the remaining bio-residue was isolated from the distillation apparatus by pouring the still flowable residue into a collection flask.

The isolated bio-residue can be used in a variety of applications as disclosed herein.

Example G

Preparation of a Bio-Adhesion Promoter

The heavy liquid component with amide compounds isolated in Example 3d having a viscosity of about 0.1 cP, but optionally having a viscosity between about 0.1 cP and about 0.3 cP at 135° C., can be combined with bitumen at between about 0.1% and about 5% by weight. Alternately, the heavy liquid component with amide-containing compounds can be combined with bitumen in amounts between about 0.5% and about 3% or between about 1% and about 2%.

The bio-modified adhesion promoter improves adhesion properties compared to virgin bitumen, as measured by a direct adhesion test of a mixture of bio-modified adhesion promoter and aggregate, evaluating the change in adhesion due to exposure to room temperature water. Without being bound by theory, the improved properties of the bio-modified asphalt are based in part on the inclusion of the Heavy Liquid Fraction having amide compounds, which promote adhesion of the asphalt to the aggregate as disclosed herein.

Example H

Preparation of a Bio-Adhesion Promoter

The heavy liquid fraction isolated in Example 3d having a viscosity of about 0.1 cP, but optionally having a viscosity between about 0.1 cP and about 0.3 cP at 135° C., can be combined with bitumen in amounts between about 0.1% and about 10% by weight to yield industrially useful bio-adhesion promoter. Alternately, the heavy liquid component with amide-containing compounds can be combined with bitumen in amounts between about 1% and about 8% or between about 2% and about 5% or between about 0.5% and about 3% or between about 1% and 2%.

The bio-modified adhesion promoter improves adhesion properties compared to virgin bitumen, as measured by a direct adhesion test of a mixture of bio-modified adhesion promoter and aggregate, evaluating the change in adhesion due to exposure to room temperature water.

The bio-adhesion promoter of the present application can be also used as Warm Mix Additive to 1) allow for reduction of mixing and compaction temperature; 2) to enhance workability; and 3) to increase moisture damage resistance. Introduction of bio-adhesive promoter to bitumen using an in-line blending in the asphalt plant can enhance workability of the resulting mixture by reducing the viscosity of the bitumen. Usually the bio-adhesive promoter is combined at about 1% to about 10% by weight with bitumen, for example the bio-adhesive component is combined at about 1% or about 2% or about 3% or about 4% or about 5% or about 6% or about 7% or about 8% or about 9% or about 10% by weight with bitumen.

Example I

Preparation of an Asphalt Bio-Extender

The heavy liquid fraction isolated in either Example 3d or Example 3e, each having a viscosity of about 0.1 cP, but optionally between about 0.1 cP and about 0.5 cP at 135° C., can each be combined at between about 1% and about 75% by weight with bitumen to yield industrially useful asphalt bio-extenders. Typically, the amount of bio-extender is between about 5% and about 50% by weight of petroleum-based asphalt.

Without being bound by theory, it is believed that the optimized viscosity of the Heavy Liquid Fraction with or without amide-containing compounds enables the fractions to be effective asphalt bio-extenders. Specifically, the Heavy Liquid Fraction is incorporated into a RAP/RAS containing asphalt formulation, wherein the RAP+RAS fraction is between about 30% and about 40%. The dynamic modulus measurement shows that the dynamic modulus of the Heavy Liquid Fraction-containing formulation corresponds well to the control formulation comprising petroleum-based asphalt with no RAP/RAS.

Example J

Preparation of an Asphalt Bio-Rejuvenator

The heavy liquid fraction isolated in either Example 3d or Example 3e, each having a viscosity of between about 0.1 cP and about 0.5 cP, can each be combined at between about 1% and 50% by weight with bitumen to yield industrially useful asphalt bio-rejuvenators.

Consistent with the results in Example D, changes to the dynamic modulus upon addition of the heavy liquid fraction shows that the bio-adhesive component is an effective bio-rejuvenator and replaces the 'soft, light' compounds that are lost as asphalt ages or oxidizes.

Example K

Preparation of Bio-Modified Binder (BMB)

The bio-residue isolated in Example 3f having a viscosity of about 0.5 cP, but optionally having a viscosity between about 0.4 cP and 1 cP, at 135° C. is combined with an asphalt binder at between about 2% and about 10%, typically about 5% by weight, using a low shear mixer at 100° C. for at least about 20 minutes, yielding a bio-modified binder having improved properties compared to a petroleum-based asphalt binder.

Example L

Preparation of Nanoclay-Containing Bio-Asphalt

The bio-residue isolated in Example 3f having a viscosity of about 0.5 cP at 135° C., but optionally having a viscosity between about 0.4 cP and 1 cP, is combined with between about 4% and about 10% by weight organonanoclay as identified in Example F using a high shear mixer for 30 minutes at 100° F. yielding a brittle aging resistant nanoclay containing bio-asphalt.

Example M

Preparation of Rubber-Containing Bio-Asphalt

The bio-residue isolated in Example 3f having a viscosity of 0.5 cP at 135° C., but optionally having a viscosity between about 0.4 cP and 1 cP, is combined with rubber as identified in Example E, using a high shear mixer for 1 hour at 100° F., yielding a flexible stand alone rubber containing bio-asphalt.

Consistent with the results in Example E, the rubber-containing bioasphalt of the present example demonstrates improved temperature susceptibility and shear susceptibility compared to the product made without the bio-residue.

Example N

Use of Bio-Residue with PG Graded Asphalt

The bio-reside isolated in Example 3f having a viscosity of about 0.5 cP, but optionally having a viscosity between about 0.4 cP and 1 cP at 135° C., is combined with PG64-22 (at 2%, 5% or 10% bio-binder per asphalt binder by weight) to produce bio-modified binder. Bio-binder and base binder are heated to 60° C. and 120° C., respectively. The base binder and bio-binder are mixed thoroughly at shear rate of 3000 rpm for 30 minutes, while the temperature is kept at 120° C.

Example O

Use of Bio-Residue as Bio-Asphalt

The bio-residue isolated in Example 3f having a viscosity of about 0.5 cP, but optionally having a viscosity between about 0.4 cP and 3 cP or between about 0.5 cP and 1 cP at 135° C. can also be used as a bio-asphalt without any modifications (such as rubber or nanoclay). Such a bio-asphalt can be used either with or without addition of petroleum-based asphalt.

The bio-asphalt of the present example demonstrates industrially useful properties, as tested by BBR and DSR (dynamic shear rheometer).

Example P

Use of Bioasphalts as Sealant and Crack Filler

The bioasphalts of the present application can also be used in sealing and filling asphalt concrete pavement cracks. In particular, bioasphalts including but not limited to pure bio-asphalt, modified bio-asphalt, and rubber-containing bioasphalt, are placed into or above cracks, generally to prevent the intrusion of water and material impurities into the cracks and to reinforce the pavement adjacent to the cracks.

Example Q

Use of Bio-Asphalt in Roofing

Bio-adhesives of the present application are used in liquid asphalt roofing, (or 'hot mop method'). In this example the bio-asphalt as prepared in Example 3f, Example K, Example M, Example N, or Example O is installed by spreading hot bio-asphalt over a roof. After application of this adhesive to a typically flatter roof, a layer of decorative rocks is distributed on top of the hot asphalt.

Example R

Use of Bioasphalts as Flooring Bio-Adhesive

Bioasphalts of the present application as prepared in Example 3f, Example K, Example N and Example O can also be used as a flooring bio-adhesive. In one aspect, bio-adhesives can replace petroleum-based adhesives which are used to install a wood floor over a cement slab. Alternately, the flooring adhesive can be used as a carpet adhesive. Such products can be evaluated according to ASTM D6004-04(2011) "Standard Test Method for Determining Adhesive Shear Strength of Carpet Adhesives" and ASTM D6005-03(2009) "Standard Test Method for Determining Slump Resistance of Carpet Adhesives."

The patents and publications listed herein describe the general skill in the art and are hereby incorporated by reference in their entireties for all purposes and to the same extent as if each was specifically and individually indicated to be incorporated by reference. In the case of any conflict between a cited reference and this specification, the specification shall control. In describing embodiments of the present application, specific terminology is employed for the sake of clarity. However, the invention is not intended to be limited to the specific terminology so selected. Nothing in this specification should be considered as limiting the scope of the present invention. All examples presented are representative and non-limiting. The above-described embodiments may be modified or varied, without departing from the invention, as appreciated by those skilled in the art in light of the above teachings. It is therefore to be understood that, within the scope of the claims and their equivalents, the invention may be practiced otherwise than as specifically described.

What is claimed:

1. A bio-modified composition comprising a bio-adhesive composition comprising:
    a bio-residue having a viscosity of at least about 0.4 cP at 135° C., wherein said bio-adhesive composition does not contain a light liquid fraction and wherein said bio-residue is isolated from bio-oil produced from animal waste, optionally in combination with one or more of asphalt, rubber, nanoclay, asphalt binder, and aggregate.

2. The bio-modified composition of claim 1, wherein the animal waste comprises beef manure, dairy manure, swine manure, sheep manure, poultry manure, or combinations thereof.

3. The bio-modified composition of claim 2, wherein the animal waste comprises swine manure comprising at least about 30% solid manure.

4. The bio-modified composition of claim 1, wherein the composition is free of compounds that have a boiling point of less than 60° C. at 3 mm Hg.

5. The bio-modified composition of claim 1, wherein the bio-residue has a viscosity of between about 0.4 cP and about 1 cP at 135° C.

6. The bio-modified composition of claim 5, wherein the bio-residue has a viscosity of between about 0.5 cP and about 1 cP at 135° C.

7. The bio-modified composition of claim 1, comprising the bio-residue and asphalt.

8. The bio-modified composition of claim 7, wherein the bio-modified composition comprises between about 5% and about 75% by weight of the bio-residue.

9. The bio-modified composition of claim 7, wherein the asphalt is recycled asphalt.

10. The bio-modified composition of claim 1, comprising the bio-residue and rubber.

11. The bio-modified composition of claim 10, wherein the rubber is present between about 5% and about 15% by weight.

12. The bio-modified composition of claim 10, wherein the rubber is crumb rubber.

13. The bio-modified composition of claim 1, comprising the bio-residue and nanoclay.

14. The bio-modified composition of claim 13, wherein the nanoclay is present between about 4% and about 10% by weight.

15. The bio-modified composition of claim 13, wherein the nanoclay is present at about 2% or about 4% by weight.

16. The bio-modified composition of claim 1, comprising the bio-residue and asphalt binder.

17. The bio-modified composition of claim 16, wherein the bio-residue is present between about 2% and about 10% by weight.

18. A method of covering a surface with a bio-modified asphalt composition, comprising contacting the surface with a composition of claim 1, wherein the surface is optionally a roof, a road, a floor, a crack or a joint in asphalt pavement.

19. A method of covering a surface with a bio-modified asphalt composition, comprising contacting the surface with a composition of claim 10, wherein the surface is optionally a crack or a joint in asphalt pavement.

* * * * *